United States Patent
Srivastava et al.

(10) Patent No.: US 10,779,210 B2
(45) Date of Patent: Sep. 15, 2020

(54) HANDOVER OF EXTENDED SYNCHRONOUS CONNECTION-ORIENTED LOGICAL TRANSPORT CHANNEL

(71) Applicant: QUALCOMM Incorporated, San Diego, CA (US)

(72) Inventors: Dishant Srivastava, Bangalore (IN); Mayank Batra, Cambridge (GB); Steven Singer, Cambridge (GB); Benjamin Campbell, Bury St Edmunds (GB); Robin Heydon, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 16/239,358

(22) Filed: Jan. 3, 2019

(65) Prior Publication Data

US 2020/0221359 A1  Jul. 9, 2020

(51) Int. Cl.
*H04W 36/00* (2009.01)
*H04W 76/23* (2018.01)
*H04W 36/30* (2009.01)
*H04W 4/80* (2018.01)

(52) U.S. Cl.
CPC .............. *H04W 36/03* (2018.08); *H04W 4/80* (2018.02); *H04W 36/30* (2013.01); *H04W 76/23* (2018.02)

(58) Field of Classification Search
CPC ....... H04W 36/03; H04W 4/80; H04W 36/30; H04W 76/23
See application file for complete search history.

(56) References Cited

U.S. PATENT DOCUMENTS

| | | | |
|---|---|---|---|
| 2012/0100803 A1* | 4/2012 | Suumaki ............. | H04W 12/001 455/41.1 |
| 2018/0091002 A1* | 3/2018 | Park ...................... | H04W 36/30 |

\* cited by examiner

*Primary Examiner* — Minjung Kim
(74) *Attorney, Agent, or Firm* — Holland & Hart LLP/Qualcomm

(57) ABSTRACT

Methods, systems, and devices for wireless communications are described. One method may include determining that a quality condition of a primary Bluetooth-enabled device is lower than a quality condition of a secondary Bluetooth-enabled device. The primary Bluetooth-enabled device may transmit, to the secondary Bluetooth-enabled device, a handover request message based on the determining. The handover request message may include a subset of connection information associated with a connection between the primary Bluetooth-enabled device and a device in wireless communications with the primary Bluetooth-enabled device. The primary Bluetooth-enabled device may receive, from the secondary Bluetooth-enabled device, a handover response message based on the handover request message. As a result, the primary Bluetooth-enabled device may handover, to the secondary Bluetooth-enabled device, at least one logical transport channel of the set of logical transport channels based on the handover response message.

20 Claims, 10 Drawing Sheets

HANDOVER OF EXTENDED SYNCHRONOUS CONNECTION-ORIENTED LOGICAL TRANSPORT CHANNEL

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems, as well as wireless local area networks (WLAN), such as Wi-Fi (i.e., Institute of Electrical and Electronics Engineers (IEEE) 802.11) and Bluetooth-related technology.

SUMMARY

The described techniques relate to improved methods, systems, devices, and apparatuses that support handover of one or more logical transport channels. A wireless device (e.g., a Bluetooth-enabled device having a primary Bluetooth-enabled component and a secondary Bluetooth-enabled component, for example, such as a pair of Bluetooth earbuds or a Bluetooth headset), may support handover of an eSCO logical transport channel from a first component to a second component (e.g., from the primary Bluetooth-enabled component to the secondary Bluetooth-enabled component). By handing over just the eSCO logical transport channel, the latency and impact on exchange of voice and audio data between a smartphone and the wireless device (e.g., a pair of wireless Bluetooth earbuds or a Bluetooth headset) may be reduced. That is, rather than handing over the complete stack (e.g., all the logical transports channels) from the first component to the second component (e.g., from the primary Bluetooth-enabled component to the secondary Bluetooth-enabled component), the first component can handover a subset, such as the logical transport channel related to transport of voice and audio data, which will decrease latency associated with processes related to the wireless communication, or disruptions in the communication of the voice and audio data.

A method of wireless communications is described. The method may include determining that a quality condition of a primary Bluetooth-enabled device is lower than a quality condition of a secondary Bluetooth-enabled device, transmitting, from the primary Bluetooth-enabled device to the secondary Bluetooth-enabled device, a handover request message based on the determining, the handover request message including a subset of connection information associated with a connection between the primary Bluetooth-enabled device and a device in wireless communications with the primary Bluetooth-enabled device, receiving, from the secondary Bluetooth-enabled device, a handover response message based on the handover request message, and handing over, from the primary Bluetooth-enabled device to the secondary Bluetooth-enabled device, at least one logical transport channel of the set of logical transport channels based on the handover response message.

An apparatus for wireless communications is described. The apparatus may include a processor, memory in electronic communication with the processor, and instructions stored in the memory. The instructions may be executable by the processor to cause the apparatus to determine that a quality condition of the apparatus is lower than a quality condition of a secondary apparatus, transmit, from the apparatus to the secondary apparatus, a handover request message based on the determining, the handover request message including a subset of connection information associated with a connection between the apparatus and a device in wireless communications with the apparatus, receive, from the secondary apparatus, a handover response message based on the handover request message, and hand over, from the apparatus to the secondary apparatus, at least one logical transport channel of the set of logical transport channels based on the handover response message.

Another apparatus for wireless communications is described. The apparatus may include means for determining that a quality condition of the apparatus is lower than a quality condition of a secondary apparatus, transmitting, from the apparatus to the secondary apparatus, a handover request message based on the determining, the handover request message including a subset of connection information associated with a connection between the apparatus and a device in wireless communications with the apparatus, receiving, from the secondary apparatus, a handover response message based on the handover request message, and handing over, from the apparatus to the secondary apparatus, at least one logical transport channel of the set of logical transport channels based on the handover response message.

A non-transitory computer-readable medium storing code for wireless communications is described. The code may include instructions executable by a processor to determine that a quality condition of a primary Bluetooth-enabled device is lower than a quality condition of a secondary Bluetooth-enabled device, transmit, from the primary Bluetooth-enabled device to the secondary Bluetooth-enabled device, a handover request message based on the determining, the handover request message including a subset of connection information associated with a connection between the primary Bluetooth-enabled device and a device in wireless communications with the primary Bluetooth-enabled device, receive, from the secondary Bluetooth-enabled device, a handover response message based on the handover request message, and hand over, from the primary Bluetooth-enabled device to the secondary Bluetooth-enabled device, at least one logical transport channel of the set of logical transport channels based on the handover response message.

Some examples of the method, apparatuses, and non-transitory computer-readable medium described herein may further include operations, features, means, or instructions for receiving timing information as part of the handover request message, the timing information indicating when the handover of the at least one logical transport channel of the set of logical transport channel from the primary Bluetooth-enabled device to the secondary Bluetooth-enabled device may be to occur.

In some examples of the method, apparatuses, and non-transitory computer-readable medium described herein, the subset of connection information includes a logical transport channel parameter associated with the at least one logical transport channel of the set of logical transport channels.

In some examples of the method, apparatuses, and non-transitory computer-readable medium described herein, at least one logical transport channel of the set of logical transport channels includes an eSCO logical transport channel, and the logical transport channel parameter includes an eSCO logical transport channel address of the eSCO logical transport channel.

In some examples of the method, apparatuses, and non-transitory computer-readable medium described herein, handing over the at least one logical transport channel of the set of logical transport channels may include operations, features, means, or instructions for handing over, from the primary Bluetooth-enabled device to the secondary Bluetooth-enabled device, the eSCO logical transport channel associated with the connection according to the eSCO logical transport channel address.

Some examples of the method, apparatuses, and non-transitory computer-readable medium described herein may further include operations, features, means, or instructions for maintaining, by the primary Bluetooth-enabled device, at least one second logical transport channel of the set of logical transport channels associated with the connection between the primary Bluetooth-enabled device and the device in wireless communications with the primary Bluetooth-enabled device based on the handover of the eSCO logical transport channel, where the at least one second logical transport channel includes an asynchronous connection-less (ACL) logical transport channel, and where maintaining the least one second logical transport channel includes maintaining the ACL logical transport channel in a connected state, where handing over the eSCO logical transport channel may be based on maintaining the ACL logical transport channel.

Some examples of the method, apparatuses, and non-transitory computer-readable medium described herein may further include operations, features, means, or instructions for adjusting an operation of the primary Bluetooth-enabled device based on handing over the at least one logical transport channel of the set of logical transport channels, where the operation includes setting a volume level of a microphone of the primary Bluetooth-enabled device, or monitoring the at least one logical transport channel of the set of logical transport channels, or a combination thereof.

Some examples of the method, apparatuses, and non-transitory computer-readable medium described herein may further include operations, features, means, or instructions for determining an absence of generated voice data at the primary Bluetooth-enabled device for a duration satisfying a threshold, where transmitting the handover request message to the secondary Bluetooth-enabled device may be based on the absence of generated voice data at the primary Bluetooth-enabled device.

Some examples of the method, apparatuses, and non-transitory computer-readable medium described herein may further include operations, features, means, or instructions for receiving, at the primary Bluetooth-enabled device, a second handover request message from the secondary Bluetooth-enabled device, the second handover request message including the subset of connection information associated with the connection between the primary Bluetooth-enabled device and the device in wireless communications with the primary Bluetooth-enabled device and the secondary Bluetooth-enabled device, transmitting, from the primary Bluetooth-enabled device, a second handover response message to the secondary Bluetooth-enabled device based on the second handover request message, and receiving, from the secondary Bluetooth-enabled device at the primary Bluetooth-enabled device, a handover of the at least one logical transport channel of the set of logical transport channels based on the second handover response message.

Some examples of the method, apparatuses, and non-transitory computer-readable medium described herein may further include operations, features, means, or instructions for monitoring, by the primary Bluetooth-enabled device, the at least one logical transport channel of the set of logical transport channels before the handover of the at least one logical transport channel of the set of logical transport channels from the secondary Bluetooth-enabled device to the primary Bluetooth-enabled device, decoding a voice packet of the secondary Bluetooth-enabled device based on the monitoring, crossfading the voice packet of the secondary Bluetooth-enabled device with a voice packet of the primary Bluetooth-enabled device, and transmitting, to the device in wireless communications with the primary Bluetooth-enabled device, a crossfaded voice packet on the at least one logical transport channel.

Some examples of the method, apparatuses, and non-transitory computer-readable medium described herein may further include operations, features, means, or instructions for receiving the voice packet of the secondary Bluetooth-enabled device over at least one second logical transport channel different from the at least one logical transport channel of the set of logical transport channels, where the at least one second logical transport channel includes an ACL logical transport channel or an eSCO logical transport channel, where decoding the voice packet may be further based on receiving the voice packet of the secondary Bluetooth-enabled device.

Some examples of the method, apparatuses, and non-transitory computer-readable medium described herein may further include operations, features, means, or instructions for mixing the voice packet of the secondary Bluetooth-enabled device with the voice packet of the primary Bluetooth-enabled device, where crossfading the voice packet of the secondary Bluetooth-enabled device with a voice packet of the primary Bluetooth-enabled device may be based on the mixing.

Some examples of the method, apparatuses, and non-transitory computer-readable medium described herein may further include operations, features, means, or instructions for receiving a noise model of the secondary Bluetooth-enabled device before the handover of the at least one logical transport channel of the set of logical transport channels from the secondary Bluetooth-enabled device to the primary Bluetooth-enabled device, and adjusting a noise level of the primary Bluetooth-enabled device in accordance with the noise model of the secondary Bluetooth-enabled device, or a noise model of the primary Bluetooth-enabled device that may be based on the noise model of the secondary Bluetooth-enabled device, or a combination thereof.

In some examples of the method, apparatuses, and non-transitory computer-readable medium described herein, the quality condition of the primary Bluetooth-enabled device comprises a signal quality associated with the connection between the primary Bluetooth-enabled device and the device in wireless communications with the primary Bluetooth-enabled device, a signal strength associated with the connection between the primary Bluetooth-enabled device and the device in wireless communications with the primary Bluetooth-enabled device, a microphone quality of the primary Bluetooth-enabled device, a battery level of the primary Bluetooth-enabled device, or a physical location of the primary Bluetooth-enabled device, or a combination thereof.

In some examples of the method, apparatuses, and non-transitory computer-readable medium described herein, the quality condition of the secondary Bluetooth-enabled device comprises a microphone quality of the secondary Bluetooth-enabled device, a battery level of the secondary Bluetooth-enabled device, a physical location of the secondary Bluetooth-enabled device, or a combination thereof.

In some examples of the method, apparatuses, and non-transitory computer-readable medium described herein, the primary Bluetooth-enabled device and the secondary Bluetooth-enabled device comprise a pair of Bluetooth earbuds or a Bluetooth headset.

DETAILED DESCRIPTION

Figure 1:
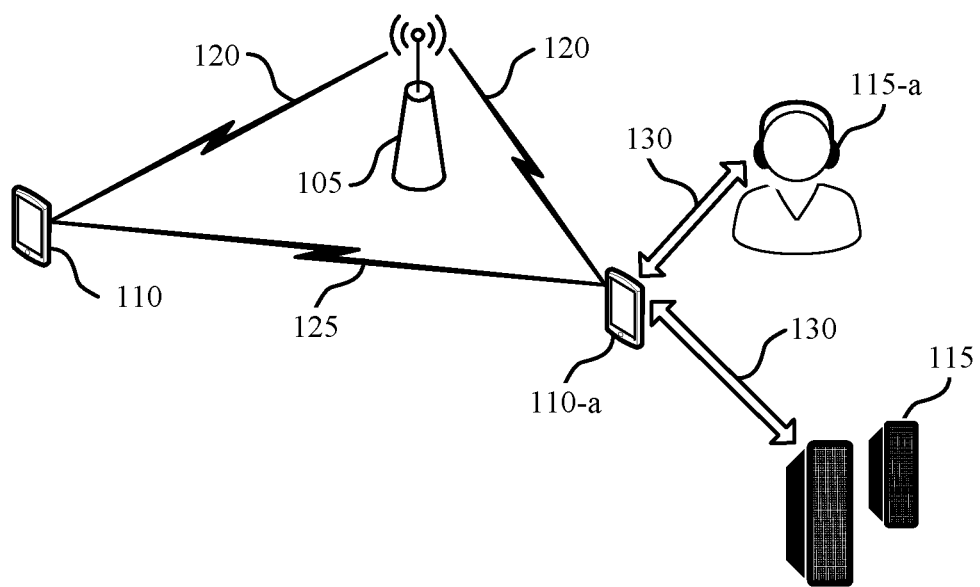
FIG. 1 illustrates an example of a system for wireless communications that supports handover of a logical transport channel in accordance with aspects of the present disclosure.

Some wireless communications systems may be capable of supporting communication, and more specifically Bluetooth-enabled communication between devices (e.g., a smartphone and a Bluetooth-enabled device). Often, for Bluetooth-enabled devices, there may be a set of components where one component is the primary and the other component is a secondary. For example, for a pair of wireless Bluetooth-enabled earbuds, one earbud may be a primary earbud (e.g., a master) and the other a secondary earbud (e.g., a slave). The primary earbud may store connection information associated with a Bluetooth connection between another device (e.g., a smartphone) and the pair of wireless Bluetooth earbuds. As part of establishing a Bluetooth connection, an asynchronous connection-less (ACL) logical transport channel and one or more extended synchronous connection-oriented (eSCO) logical transport channels may be established.

The ACL logical transport channel may support transport of control data, while the eSCO logical transport channel may support transport of voice and audio data. The primary earbud may store connection information including ACL and eSCO logical transport channel parameters (e.g., an ACL and eSCO logical transport address (LT_ADDR)) to manage transport of voice and audio data via the Bluetooth connection. To maintain or improve a quality of the voice and audio data transmission, the primary earbud may become the secondary earbud, or vice versa based on a condition, for example, a quality of service (QoS), a range, a power level, among others associated with the Bluetooth-enabled device. Because the primary earbud holds the connection information, it may be beneficial for the primary earbud to handover the connection information to the secondary earbud in an efficient manner, to sustain or enhance the quality of the voice and audio data with minimal overhead (e.g., power consumption, latency).

The present disclosure relates to improved methods, systems, devices, and apparatuses that support a handover of an eSCO logical transport channel, and more specifically handover of connection information between Bluetooth-enabled devices. To address the challenges of existing techniques, a Bluetooth-enabled device such as, a primary earbud of a pair of wireless Bluetooth earbuds may handover a subset of the connection information to a secondary earbud of the pair of wireless Bluetooth earbuds. A subset of the connection information may include an eSCO logical transport channel and eSCO logical transport channel parameter, such as an eSCO LT_ADDR. For example, a primary earbud may handover the eSCO logical transport channel, based on the eSCO LT_ADDR, to the secondary earbud allowing the secondary earbud to support transport of voice data to a smartphone in wireless communications with the pair of wireless Bluetooth earbuds via the handed over eSCO logical transport channel. Handing over a subset of the connection information may reduce the latency and impact on exchange of voice and audio data between a smartphone and a pair of wireless Bluetooth earbuds or a Bluetooth headset.

Aspects of the disclosure are initially described in the context of a wireless communications system. Aspects of the disclosure are then illustrated by and described with reference to a process flow. Aspects of the disclosure are further illustrated by and described with reference to apparatus diagrams, system diagrams, and flowcharts that relate to handover of extended synchronous connection-oriented logical transport channel.

FIG. 1 illustrates an example of a wireless communications system 100 that supports handover of a logical transport channel in accordance with aspects of the present disclosure. In some examples, the wireless communications system 100 may include or refer to a wireless personal area network (PAN), a wireless local area network (WLAN), a Wi-Fi network) configured in accordance with various aspects of the present disclosure. The wireless communications system 100 may include an access point (AP) 105, devices 110, and paired devices 115 implementing WLAN communications (e.g., Wi-Fi communications) and/or Bluetooth communications. For example, devices 110 may include cell phones, mobile stations, personal digital assistant (PDAs), other handheld devices, netbooks, notebook computers, tablet computers, laptops, or some other suitable terminology. Paired devices 115 may include Bluetooth-enabled devices capable of pairing with other Bluetooth-enabled devices (e.g., such as devices 110), which may include wireless headsets, earbuds, speakers, ear pieces, headphones, display devices (e.g., TVs, computer monitors), microphones, meters, valves, etc.

Bluetooth communications may refer to a short-range communication protocol and may be used to connect and exchange information between devices 110 and paired devices 115 (e.g., between mobile phones, computers, digital cameras, wireless headsets, speakers, keyboards, mice or other input peripherals, and similar devices). Bluetooth systems (e.g., aspects of wireless communications system 100) may be organized using a master-slave relationship employing a time-division duplex protocol having, for example, defined time slots of 625 mu seconds, in which transmission alternates between the master device (e.g., a device 110) and one or more slave devices (e.g., paired devices 115). In some examples, a device 110 may generally refer to a master device, and a paired device 115 may refer to a slave device in the wireless communications system 100. As such, in some examples, a device may be referred to as either a device 110 or a paired device 115 based on the Bluetooth role configuration of the device. That is, designation of a device as either a device 110 or a paired device 115 may not necessarily indicate a distinction in device capability, but rather may refer to or indicate roles held by the device in the wireless communications system 100. Generally, device 110 may refer to a wireless communication device capable of wirelessly exchanging data signals with another device, and paired device 115 may refer to a device operating in a slave role, or to a short-range wireless device capable of exchanging data signals with the mobile device (e.g., using Bluetooth communication protocols).

A Bluetooth-enabled device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth-enabled devices may be offering. The Bluetooth specification defines device role pairs that together form a single use case called a profile. One example profile defined in the Bluetooth specification is the Handsfree Profile (HFP) for voice telephony, in which one device implements an Audio Gateway (AG) role and the other device implements a Handsfree (HF) device role. Another example is the Advanced Audio Distribution Profile (A2DP) for high-quality audio streaming, in which one device (e.g., device 110-*a*) implements an audio source device (SRC) role and another device (e.g., paired device 115-*a*) implements an audio sink device (SNK) role.

For a commercial Bluetooth-enabled device that implements one role in a profile to function properly, another device that implements the corresponding role may be present within the radio range of the first device. For example, in order for an HF device such as a Bluetooth headset to function according to the Handsfree Profile, a device implementing the AG role (e.g., a cell phone) may have to be present within radio range. Likewise, in order to stream high-quality mono or stereo audio according to the A2DP, a device implementing the SNK role (e.g., Bluetooth headphones or Bluetooth speakers) may have to be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (e.g., flow control, acknowledgement mechanisms, repeat mechanisms, sequence numbering, scheduling behavior, etc.). The Bluetooth protocol stack may be split in two parts: a controller stack including the timing critical radio interface, and a host stack handling high level data. The controller stack may be generally implemented in a low cost silicon device including a Bluetooth radio and a microprocessor. The controller stack may be responsible for setting up links 130 such as ACL logical transport channels (also referred to herein as ACL links or ACL connections), synchronous connection orientated (SCO) logical transport channels (also referred to herein as SCO links or SCO connections), eSCO transport channels (also referred to herein as eSCO links or eSCO connections), etc.

In some examples, the controller stack may implement link management protocol (LMP) functions, low energy link layer (LELL) functions, etc. The host stack may be generally implemented as part of an operating system, or as an installable package on top of an operating system. The host stack may be responsible for logical link control and adaptation protocol (L2CAP) functions, Bluetooth network encapsulation protocol (BNEP) functions, service discovery protocol (SDP) functions, etc. In some examples, the controller stack and the host stack may communicate via a host controller interface (HCI). In other cases, (e.g., for integrated devices such as Bluetooth headsets), the host stack and controller stack may be run on the same microprocessor to reduce mass production costs. For such host-less systems, the HCI may be optional, and may be implemented as an internal software interface.

A link 130 established between two Bluetooth-enabled devices (e.g., between a device 110-*a* and a paired device 115-*a*) may provide for communications or services (e.g., according to some Bluetooth profile). For example, a Bluetooth connection may be an eSCO connection for voice call (e.g., which may allow for retransmission), an ACL connection for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., paired device 115-*a*) are acknowledged, and may be retransmitted if not acknowledged during a retransmission window. In addition, audio may be streamed between the device 110-*a* and paired device 115-*a* using an ACL connection (A2DP profile). In some cases, the ACL connection may occupy 1, 3, or 5 Bluetooth slots for data or voice. Other Bluetooth profiles supported by Bluetooth-enabled devices may include Bluetooth Low Energy (BLE) (e.g., providing considerably reduced power consumption and cost while maintaining a similar communication range), human interface device profile (HID) (e.g., providing low latency links with low power requirements), etc.

For Bluetooth-enabled devices, such as paired device 115-*a* (e.g., a pair of Bluetooth earbuds or a Bluetooth headset) there may be a set of components where one is the primary (e.g., master) and the other a secondary (e.g., slave). For example, for a pair of wireless Bluetooth-enabled earbuds, one earbud may be a primary earbud (e.g., master) and the other a secondary earbud (e.g., slave). The primary earbud may store connection information associated with a Bluetooth connection (e.g., ACL connections, eSCO connections) between the device 110-*a* and the paired device 115-*a*. As part of establishing a Bluetooth connection (e.g., link 130), an ACL logical transport channel and one or more eSCO logical transport channels may be established. The ACL logical transport channel may support transport of control data between the device 110-*a* and the paired device 115-*a*, while the eSCO logical transport channel may support transport of voice and audio data between the device 110-*a* and the paired device 115-*a*.

In some examples, the primary component of the paired device 115-*a* may store connection information including ACL and eSCO logical transport channel parameters (e.g., an ACL LT_ADDR and an eSCO LT_ADDR) to manage transport of voice and audio data via the Bluetooth connection between the device 110-*a* and the paired device 115-*a*. For example, the device 110-*a* may have an ACL connection and one or more eSCO connections with the primary component of the paired device 115-*a*, while the secondary component of the paired device 115-*a* may obtain synchronization information of the ACL and eSCO connections from the primary component of the paired device 115-*a*. In this example, the secondary component of the paired device 115-*a* may monitor (also referred to herein as sniffing) both connections and then rendering the eSCO packet data. Because the primary component of the paired device 115-*a* owns the ACL and eSCO LT_ADDRs, only the primary component of the paired device 115-*a* may be allowed to transmit eSCO packets on the two connections (e.g., the ACL and eSCO connections). The primary component of the paired device 115-*a* is therefore transmitting its voice data (e.g., microphone data) on the eSCO connection. To maintain or improve a quality of the voice and audio data, the primary component of the paired device 115-*a* may become the secondary component of the paired device 115-*a*, or vice versa based on a condition, for example, a quality of service (QoS), a range, a power level, among others associated with the paired device 115-*a*. Therefore, because the primary component (e.g., master) of the paired device 115-*a* holds the connection information, it may be beneficial for the primary component of the paired device 115-*a* to handover the connection information to the secondary component (e.g., slave) of the paired device 115-*a*, to maintain or enhance the quality of the voice and audio data with minimal overhead (e.g., power consumption, latency).

In some examples, the primary component of the paired device 115-*a* may handover the entire connection information to the secondary component. For example, when an individual on a phone call via a smartphone roams out of range from the primary component of the paired device 115-*a*, with the secondary component of the paired device 115-*a* being within range of the smartphone, the primary component of the paired device 115-*a* may handover the entire connection information to the secondary component. Alternatively, the primary component of the paired device 115-*a* may handover the entire connection information to the secondary component, for example, when both the primary component and the secondary component of the paired device 115-*a* are within range of the smartphone, but the microphone quality on the secondary component is greater than the microphone quality of the primary component. Handing the entire connection information from the primary to the secondary, such that the new primary owns both the ACL and eSCO LT_ADDRs, however, may be challenging and result in unnecessary latency and reduced quality of the voice and audio data, as well as increased signaling overhead.

To attain the benefits of the present disclosure and address the shortcoming of standing techniques, the paired device 115-*a* may handover a subset of the connection information to the secondary component (e.g., slave). In this case, the secondary component (e.g., slave) becomes the primary component (e.g., master). A subset of the connection information may include an eSCO logical transport channel and eSCO logical transport channel parameter, such as an eSCO LT_ADDR. By way of example, for a pair of wireless Bluetooth earbuds, a primary earbud may handover an eSCO logical transport channel based on an eSCO LT_ADDR to the secondary earbud allowing the secondary earbud to support transport of voice data to a smartphone in wireless communications with the pair of wireless Bluetooth earbuds via an established eSCO logical transport channel. As such, rather than performing a full primary and secondary switch, the primary component of the paired device 115-*a* hands over the eSCO LT_ADDR to the secondary component of the paired device 115-*a*. That is, the primary component of the paired device 115-*a* makes the secondary component of the paired device 115-*a* the owner of the eSCO LT_ADDR allowing it to transmit its eSCO packets (e.g., microphone data) on the eSCO connection. Handing over only a subset of the connection information therefore may decrease the latency and effect on exchange of voice and audio data between a smartphone and a pair of wireless Bluetooth earbuds.

A device may, in some examples, be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some examples, Bluetooth and WLAN communications may share a same medium, such as the same unlicensed frequency medium. In such examples, a device 110 may support WLAN communications via AP 105 (e.g., over communication links 120). The AP 105 and the associated devices 110 may represent a basic service set (BSS) or an extended service set (ESS). The various devices 110 in the network may be able to communicate with one another through the AP 105. In some cases the AP 105 may be associated with a coverage area, which may represent a basic service area (BSA).

Devices 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100. AP 105 may be coupled to a network, such as the Internet, and may enable a device 110 to communicate via the network (or communicate with other devices 110 coupled to the AP 105). A device 110 may communicate with a network device bi-directionally. For example, in a WLAN, a device 110 may communicate with an associated AP 105 via downlink (e.g., the communication link from the AP 105 to the device 110) and uplink (e.g., the communication link from the device 110 to the AP 105).

In some examples, content, media, audio, etc. exchanged between a device 110 and a paired device 115 may originate from a WLAN. For example, in some examples, device 110-*a* may receive audio from an AP 105 (e.g., via WLAN communications), and the device 110-*a* may then implement the described techniques to relay or pass the audio to the paired device 115-*a* (e.g., via Bluetooth communications). In some examples, certain types of Bluetooth communications (e.g., such as high quality or high definition (HD) Bluetooth) may require enhanced quality of service. For example, in some examples, delay-sensitive Bluetooth traffic may have higher priority than WLAN traffic.

Accordingly, the techniques described herein may provide improvements in handover of a logical transport channel. The techniques described herein may provide benefits and enhancements to the operation of a device 110 and a paired device 115. For example, by providing a subset of connection information, the operational characteristics, such as power consumption, processor utilization, and memory usage of the paired device 115 may be reduced. In another example, the techniques described herein may maintain or enhance a quality of voice and audio data transmission between the device 110 and the paired device 115 by handing over a subset of the complete stack, such as the eSCO logical transport channel, rather than having to handover the complete stack (e.g., all the logical transports channels). The techniques described herein may also provide efficiency to the paired device 115 by reducing latency associated with processes related to wireless communications, and more specifically to handover of an eSCO logical transport channel by reducing overhead signaling related to information provided for the handover of the eSCO logical transport channel.

Figure 2:
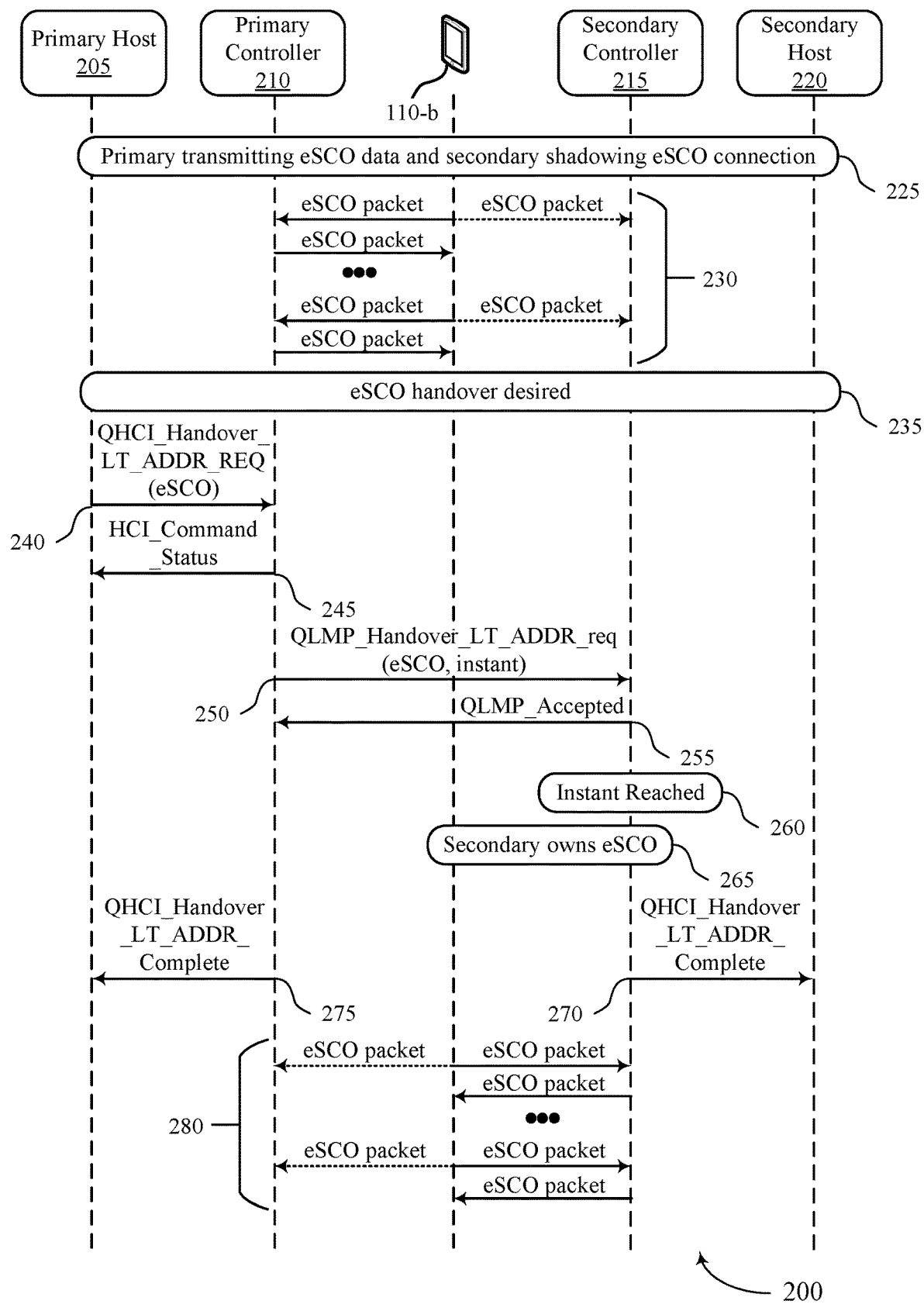
FIG. 2 illustrates an example of a process flow that supports handover of a logical transport channel in accordance with aspects of the present disclosure.

FIG. 2 illustrates an example of a process flow 200 that supports handover of a logical transport channel in accordance with aspects of the present disclosure. The process flow 200 may be related to a system that includes a device 110-b, which may be examples of the corresponding devices 110 described with reference to FIG. 1. The process flow 200 may also be related to a system that includes a primary host 205, a primary controller 210, a secondary controller 215, and a secondary host 220, which may be examples of the corresponding devices described with reference to FIG. 1, for example a paired device 115. The primary host 205 and the primary controller 210 may be a logical entity, which may be part of a primary Bluetooth-enabled device of the paired device 115. The secondary controller 215 and the secondary host 220 may also be a logical entity, which may be part of a secondary Bluetooth-enabled device of the paired device 115. For example, the primary Bluetooth-enabled device and the secondary Bluetooth-enabled device may be a pair of wireless Bluetooth earbuds or a wireless Bluetooth headset. In some examples, the primary host 205 and the primary controller 210 may be collectively referred to as a primary Bluetooth-enabled device, while the secondary controller 215 and the secondary host 220 may be collectively referred to as a secondary Bluetooth-enabled device.

The process flow 200 may implement aspects associated with the wireless communications system 100. For example, the device 110-b, the primary host 205, the primary controller 210, the secondary controller 215, or the secondary host 220, or a combination thereof may support handover of a logical transport channel, such as an eSCO logical transport channel. Accordingly, some benefits of the process flow 200 may include enhanced efficiency (e.g., operational characteristics, such as power consumption, processor utilization, and memory usage), and improved signaling of a subset of connection information with minimal messaging overhead.

In the following description of the process flow 200, the operations between the device 110-b, the primary host 205, the primary controller 210, the secondary controller 215, and the secondary host 220 may be transmitted in a different order than the exemplary order shown, or the operations performed by the device 110-b, the primary host 205, the primary controller 210, the secondary controller 215, and the secondary host 220 may be performed in different orders or at different times. Certain operations may also be omitted from the process flow 200, and/or other operations may be added to the process flow 200.

In some examples, the process flow 200 may commence with the device 110-b and a paired device 115 (e.g., a pair of wireless Bluetooth earbuds or a wireless Bluetooth headset) establishing a connection. For example, the device 110-b and the paired device (e.g., the primary host 205, the primary controller 210, the secondary controller 215, and the secondary host 220) may establish a Bluetooth connection. The Bluetooth connection may include a set of one or more logical transport channels (e.g., ACL connections, eSCO connections).

At 225, the primary controller 210 may transmit one or more packets, such as eSCO packets, to the device 110-b via the Bluetooth connection (e.g., on an eSCO logical transport channel), while the secondary controller 215 may shadow (e.g., monitor) the Bluetooth connection (e.g., the eSCO logical transport channel). For example, the secondary controller 215 may receive information (e.g., voice and audio data) exchanged by eavesdropping on the Bluetooth connection. In some examples, a logical transport channel of the set associated with the Bluetooth connection may be a connection, such as an eSCO connection, for a voice call (e.g., which may allow for retransmission). At 230, the primary controller 210 may continue to transmit one or more eSCO packets to the device 110-b via the Bluetooth connection, while the secondary controller 215 may continue to shadow (e.g., sniff) the Bluetooth connection. In some examples, the eSCO packets may be transmitted in predetermined time slots (e.g., 6 Bluetooth slots each for eSCO) to the device 110-b.

At 235, the paired device (e.g., the primary host 205, the primary controller 210, the secondary controller 215, and the secondary host 220) may request a handover (e.g., during the voice call). The handover may include handing over at least one logical transport channel of the set of logical transport channels associated with the Bluetooth connection. In some examples, the paired device may desire a handover during a voice call or another operation based on determining that a quality condition associated with the primary Bluetooth-enabled device is lower than a quality condition of the secondary Bluetooth-enabled device. The quality condition may include, but is not limited to, a signal quality, a signal strength, a microphone quality, a battery level, or a physical location, or any combination thereof. These examples, among others, are described more herein.

In some examples, the paired device may determine that a signal quality associated with the Bluetooth connection between the primary Bluetooth-enabled device and the device 110-b is lower than a signal quality associated with the Bluetooth connection between the secondary Bluetooth-enabled device and the device 110-b. For example, the signal quality associated with the primary Bluetooth-enabled device may be below a threshold dBm, while the signal quality associated with the secondary Bluetooth-enabled device may be equal to or greater than the threshold dBm.

In further examples, the paired device may determine that a signal strength between the primary Bluetooth-enabled device and the device 110-b is lower than a signal strength associated with the Bluetooth connection between the secondary Bluetooth-enabled device and the device 110-b. For example, the signal strength associated with the primary Bluetooth-enabled device may be below a threshold received signal strength indicator (RSSI) value, while the signal quality associated with the secondary Bluetooth-enabled device may be equal to or greater than the threshold RSSI value.

The paired device may additionally, or alternatively determine that a microphone quality of the primary Bluetooth-enabled device is lower than a microphone quality of the secondary Bluetooth-enabled device. A microphone quality may refer to an accuracy of voice data, a delay of the voice data, or a combination thereof. In some examples, the paired device may determine an absence of generated voice data at the primary Bluetooth-enabled device for a duration satisfying a threshold, and determine a presence of generated voice data at the secondary Bluetooth-enabled device during the duration.

The paired device 115 may additionally, or alternatively determine that a battery level of the primary Bluetooth-enabled device is lower than a battery level of the secondary Bluetooth-enabled device. In some examples, the paired device 115 may determine that a physical location of the primary Bluetooth-enabled device is above a threshold range from the device 110-b compared to the physical location of the secondary Bluetooth-enabled device. Therefore, the paired device (e.g., the primary host 205, the primary controller 210, the secondary controller 215, and the secondary host 220) may desire a handover based at least in part on one or more of the examples described herein. In some examples, the determination of the handover may be performed at a higher level, for example, at an application level where the quality condition(s) are analyzed.

To achieve the benefits of the present disclosure, the device 110-b may support handover of a logical transport channel by reducing overhead signaling related to information provided for the handover of the logical transport channel. As one example, the primary Bluetooth-enabled device may handover a subset of connection information to the secondary Bluetooth-enabled device. In this case, the secondary controller 215/secondary host 220 may become the master, while the primary host 205/primary controller 210 may become the slave. By handing over only a subset of the connection information both latency and power on exchange of voice and audio data between the device 110-b and the paired device (e.g., the primary Bluetooth-enabled device or the secondary Bluetooth-enabled device) may be reduced. As a result, rather than having to handover the complete stack (e.g., all the logical transports channels) from the primary host 205/primary controller 210 to the secondary controller 215/secondary host 220, the primary host 205/primary controller 210 can handover (e.g., solely handover in some cases) the logical transport channel related to transport of voice and audio data to the secondary controller 215/secondary host 220 via minimal overhead signaling; thereby not affecting the quality of the voice and audio data between the device 110-b and the paired device.

At 240, the primary host 205 may transmit a handover request message (e.g., a query host controller interface (QHCI) handover request message) to the primary controller 210. In some examples, the QHCI handover request message may include a logical transport channel parameter, for example, such as a logical transport channel address associated with a logical transport channel (e.g., QHCI_Handover_LT_ADDR_REQ). At 245, the primary controller 210 may confirm reception of the QHCI handover request message from the primary host 205. In some cases, this confirmation may be made by transmitting a host controller interface (HCI) message (e.g., HCI_Command_Status) to the primary host 205.

At 250, the primary controller 210 may transmit a handover request message to the secondary controller 215. The handover request message may, in some cases, include a subset of connection information associated with the Bluetooth connection between the primary Bluetooth-enabled device and the device 110-b. The subset of connection information may include a logical transport channel parameter associated with at least one logical transport channel of the set of logical transport channels associated with the Bluetooth connection.

For example, the at least one logical transport channel of the set of logical transport channels may include an eSCO logical transport channel, and the logical transport channel parameter may include an eSCO logical transport channel address of the eSCO logical transport channel (e.g., eSCO LT_ADDR), as described herein. In some examples, the subset of connection information may include the eSCO LT_ADDR, and additionally or alternatively include timing information (e.g., an instant) indicating when the handover of the logical transport channel is to occur (e.g., QLMP_Handover_LT_ADDR_req (eSCO, instant)). At 255, the secondary controller 215 may receive the handover request message from the primary controller 210, and respond in some cases by transmitting a handover response message (e.g., QLMP_Accepted) to the primary controller 210.

At 260, the secondary controller 215 may determine when the handover of the logical transport channel is to occur or has occurred. In this case, at 265, the ownership (i.e., the device actively communicating voice and/or audio data on the logical transport channel) of the logical transport channel (e.g., eSCO LT_ADDR) may be passed from the primary Bluetooth-enabled device to the secondary Bluetooth-enabled device. That is, the primary host 205/primary controller 210 may handover to the secondary controller 215/secondary host 220 the eSCO logical transport channel. In some examples, the handover of the eSCO logical transport channel may be based on the eSCO LT_ADDR, for example, to distinguish between eSCO logical transport channels when the primary Bluetooth-enabled device has more than one eSCO logical transport channel associated with the Bluetooth connection. Although the primary Bluetooth-enabled device may handover to the secondary Bluetooth-enabled device the eSCO logical transport channel, the primary Bluetooth-enabled device may maintain at least one second logical transport channel of the set of logical transport channels associated with the Bluetooth connection. As such, rather than having to handover the complete stack (e.g., all the logical transports channels) from the primary host 205/primary controller 210 to the secondary controller 215/secondary host 220, the primary host 205/primary controller 210 can handover a subset of information, such as the logical transport channel related to transport of voice and audio data, which will reduce overhead signaling related to information provided for the handover of the logical transport channel, among other benefits described herein. The at least one second logical transport channel may include an ACL logical transport channel or another eSCO logical transport channel. In some examples, the primary Bluetooth-enabled device may adjust an operation, for example, setting a volume level of a microphone of the primary Bluetooth-enabled device, or monitoring the handed over eSCO logical transport channel (e.g., sniffing the eSCO logical transport channel for eSCO packets from the secondary Bluetooth-enabled device).

In some examples, (e.g., before or after) the handover, the secondary Bluetooth-enabled device may in some examples, monitor (e.g., sniff) the eSCO logical transport channel to obtain and/or decode an eSCO data packet (e.g., microphone data) from the primary Bluetooth-enabled device. In this example, the secondary Bluetooth-enabled device may crossfade the eSCO data packet with an eSCO data packet of the secondary Bluetooth-enabled device and transmit a crossfaded eSCO data packet on the eSCO logical transport channel after the handover. In some examples, the secondary Bluetooth-enabled device may transmit an eSCO data packet (e.g., microphone data) to the primary Bluetooth-enabled device over at least one second logical transport channel different from the handed over eSCO logical transport channel. For example, the secondary Bluetooth-enabled device may transmit an eSCO data packet (e.g., microphone data) to the primary Bluetooth-enabled device over an ACL logical transport channel or another eSCO logical transport channel, or as part of an eSCO sniffing scheme before the handover. Similarly, the primary Bluetooth-enabled device may obtain and/or decode an eSCO data packet (e.g., microphone data) of the secondary Bluetooth-enabled device, and crossfade the eSCO data packet (e.g., audio stream) into the eSCO stream before the handover instant.

In some examples, an indication or representation (e.g., a model) of the noise associated with the primary Bluetooth-enabled device microphone may be transmitted to the secondary Bluetooth-enabled device, for example, before or after the handover. The secondary Bluetooth-enabled device may additively recreate the model of the noise associated with the primary Bluetooth-enabled device (taking into accounts a model of its own noise) on its own microphone data (e.g., immediately after handover). After handover, the secondary Bluetooth-enabled device may slowly reduce addition of the noise associated with the primary Bluetooth-enabled device until only the secondary Bluetooth-enabled device's (lower) noise level remains. Additionally, or alternatively, the secondary Bluetooth-enabled device may mix eSCO data packets (e.g., microphone data) from both the primary Bluetooth-enabled device and the secondary Bluetooth-enabled device, and transmit the mixed eSCO data packet to the device 110-b via the handed over eSCO logical transport channel. For example, when two individual may each have one earbud and are both conversing with a remote caller.

At 270, the secondary controller 215 may transmit a handover complete message (e.g., QHCI_Handover_LT_ADDR_Complete) to the secondary host 220 indicating the handover is complete. At 275, the primary controller 210 may transmit a handover complete message (e.g., QHCI_Handover_LT_ADDR_Complete) to the primary host 205 indicating the handover is complete. The ownership of the eSCO logical transport channel may be changed again by repeating the above procedure (e.g., the secondary controller 215 may transmit to the primary controller 210 a handover request message, and the primary controller 210 may respond with a handover accept message (e.g., QLMP_accepted). Therefore, the ownership may be changed at this instant (e.g., reception of the handover accept message). At 280, the secondary controller 215 may transmit one or more eSCO packets to the device 110-b via the Bluetooth connection (e.g., on the handed over eSCO logical transport channel), while the primary controller 210 may monitor (e.g., sniff) the Bluetooth connection (e.g., the eSCO logical transport channel).

Therefore, the present disclosure may provide improvements in handover of a logical transport channel. Furthermore, the techniques described herein may provide benefits and enhancements to the operation of a device 110 and a paired device 115. For example, by providing a subset of connection information, the operational characteristics, such as power consumption, processor utilization, and memory usage may be reduced. In another example, the techniques described herein may maintain or enhance a quality of voice and audio data transmission between the device 110 and the paired device 115 by solely handing over the eSCO logical transport channel. The techniques described herein may also provide efficiency to the paired device 115 by reducing latency associated with processes related to wireless communications, and more specifically to handover of an eSCO logical transport channel.

Figure 3:
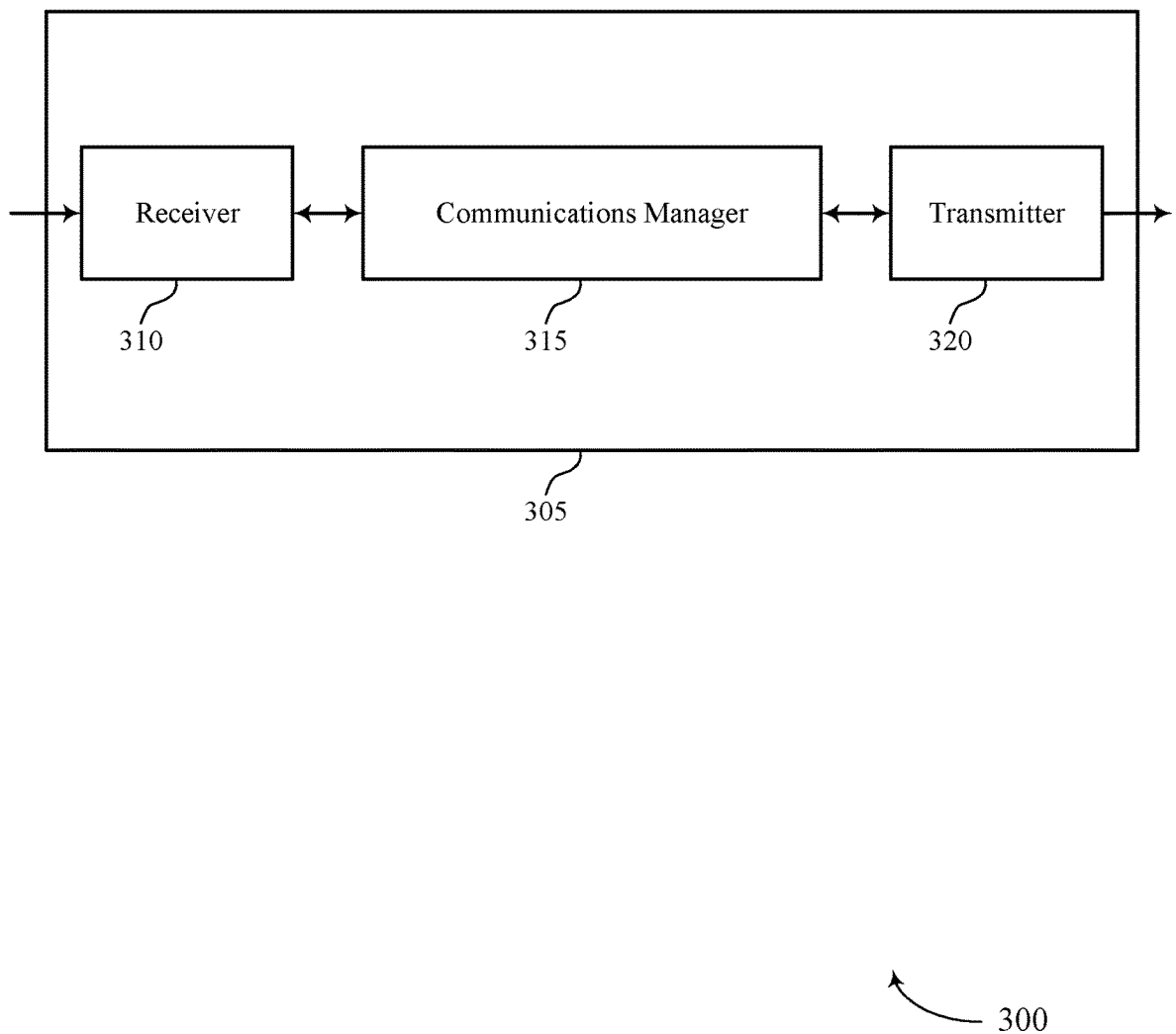
FIGS. 3 and 4 show block diagrams of devices that support handover of a logical transport channel in accordance with aspects of the present disclosure.

FIG. 3 shows a block diagram 300 of a device 305 that supports handover of a logical transport channel in accordance with aspects of the present disclosure. The device 305 may be an example of aspects of a device as described herein, such as a Bluetooth-enabled device, which may include a primary Bluetooth-enabled device and a secondary Bluetooth-enabled device, for example, a pair of Bluetooth earbuds or a Bluetooth headset. The device 305 may include a receiver 310, a communications manager 315, and a transmitter 320. The device 305 may also include a processor. Each of these components may be in communication with one another (e.g., via one or more buses).

The receiver 310 may receive information such as packets, user data, or control information associated with various information channels (e.g., control channels, data channels, and information related to handover of extended synchronous connection-oriented logical transport channel, etc.). Information may be passed on to other components of the device 305. The receiver 310 may be an example of aspects of the transceiver 620 described with reference to FIG. 6. The receiver 310 may utilize a single antenna or a set of antennas.

The communications manager 315 may determine that a quality condition of a primary Bluetooth-enabled device is lower than a quality condition of a secondary Bluetooth-enabled device, transmit, from the primary Bluetooth-enabled device to the secondary Bluetooth-enabled device, a handover request message based on the determining, the handover request message including a subset of connection information associated with a connection between the primary Bluetooth-enabled device and a device in wireless communications with the primary Bluetooth-enabled device, receive, from the secondary Bluetooth-enabled device, a handover response message based on the handover request message, and hand over, from the primary Bluetooth-enabled device to the secondary Bluetooth-enabled device, at least one logical transport channel of the set of logical transport channels based on the handover response message. The communications manager 315 may be an example of aspects of the communications manager 610 described herein.

The communications manager 315, or its sub-components, may be implemented in hardware, code (e.g., software or firmware) executed by a processor, or any combination thereof. If implemented in code executed by a processor, the functions of the communications manager 315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 315, or its sub-components, may be physically located at various positions, including being distributed such that portions of functions are implemented at different physical locations by one or more physical components. In some examples, the communications manager 315, or its sub-components, may be a separate and distinct component in accordance with various aspects of the present disclosure. In some examples, the communications manager 315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 320 may transmit signals generated by other components of the device 305. In some examples, the transmitter 320 may be collocated with a receiver 310 in a transceiver module. For example, the transmitter 320 may be an example of aspects of the transceiver 620 described with reference to FIG. 6. The transmitter 320 may utilize a single antenna or a set of antennas.

Figure 4:
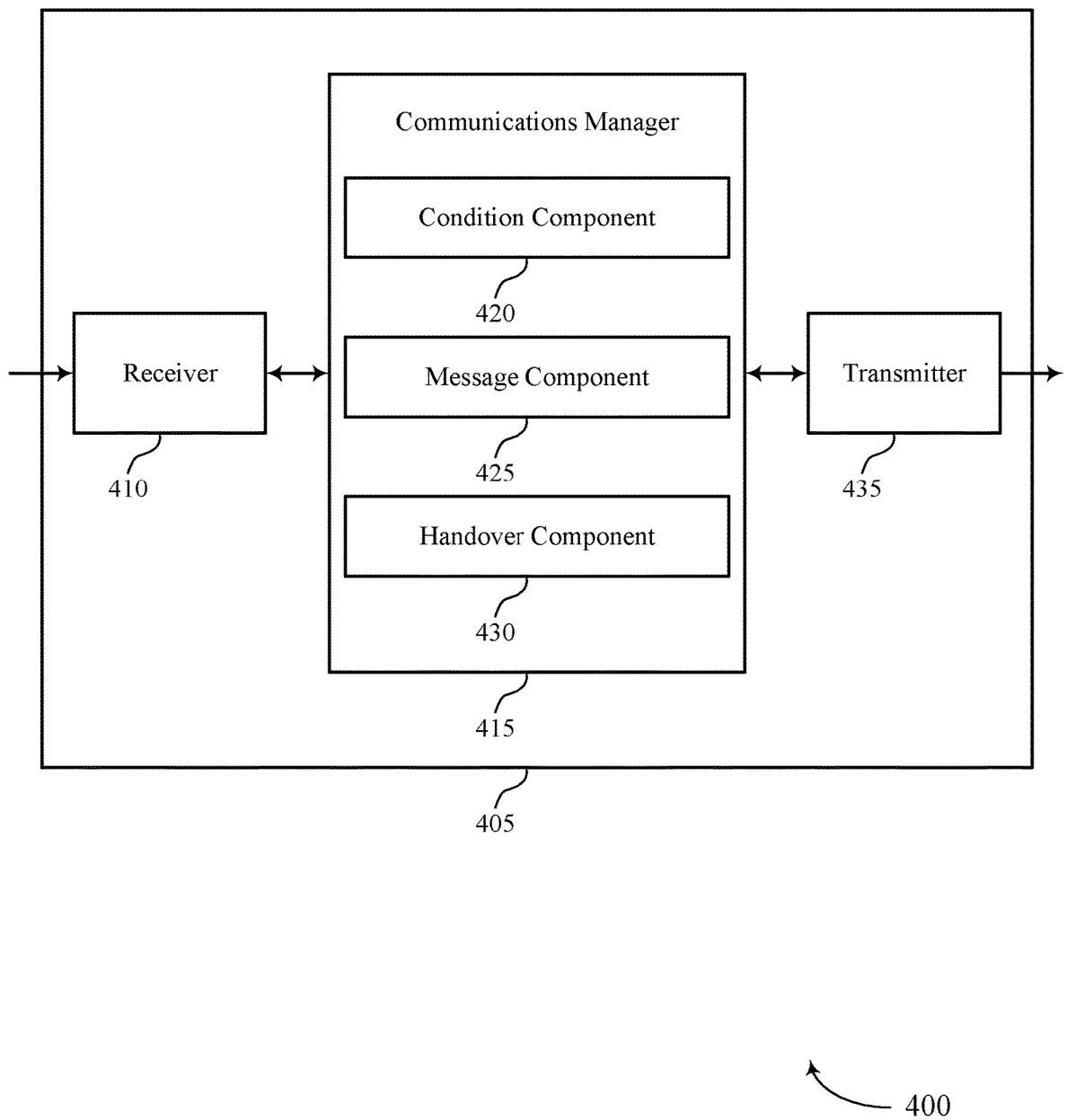

FIG. 4 shows a block diagram 400 of a device 405 that supports handover of a logical transport channel in accordance with aspects of the present disclosure. The device 405 may be an example of aspects of a device 305 or a paired device 115 as described herein, such as a Bluetooth-enabled device, which may include a primary Bluetooth-enabled device and a secondary Bluetooth-enabled device, for example, a pair of Bluetooth earbuds or a Bluetooth headset. The device 405 may include a receiver 410, a communications manager 415, and a transmitter 435. The device 405 may also include a processor. Each of these components may be in communication with one another (e.g., via one or more buses).

The receiver 410 may receive information such as packets, user data, or control information associated with various information channels (e.g., control channels, data channels, and information related to handover of extended synchronous connection-oriented logical transport channel, etc.). Information may be passed on to other components of the device 405. The receiver 410 may be an example of aspects of the transceiver 620 described with reference to FIG. 6. The receiver 410 may utilize a single antenna or a set of antennas.

The communications manager 415 may be an example of aspects of the communications manager 315 as described herein. The communications manager 415 may include a condition component 420, a message component 425, and a handover component 430. The communications manager 415 may be an example of aspects of the communications manager 610 described herein.

The condition component 420 may determine that a quality condition of a primary Bluetooth-enabled device is lower than a quality condition of a secondary Bluetooth-enabled device. The message component 425 may transmit, from the primary Bluetooth-enabled device to the secondary Bluetooth-enabled device, a handover request message based on the determining, the handover request message including a subset of connection information associated with a connection between the primary Bluetooth-enabled device and a device in wireless communications with the primary Bluetooth-enabled device and receive, from the secondary Bluetooth-enabled device, a handover response message based on the handover request message. The handover component 430 may hand over, from the primary Bluetooth-enabled device to the secondary Bluetooth-enabled device, at least one logical transport channel of the set of logical transport channels based on the handover response message.

The transmitter 435 may transmit signals generated by other components of the device 405. In some examples, the transmitter 435 may be collocated with a receiver 410 in a transceiver module. For example, the transmitter 435 may be an example of aspects of the transceiver 620 described with reference to FIG. 6. The transmitter 435 may utilize a single antenna or a set of antennas.

Figure 5:
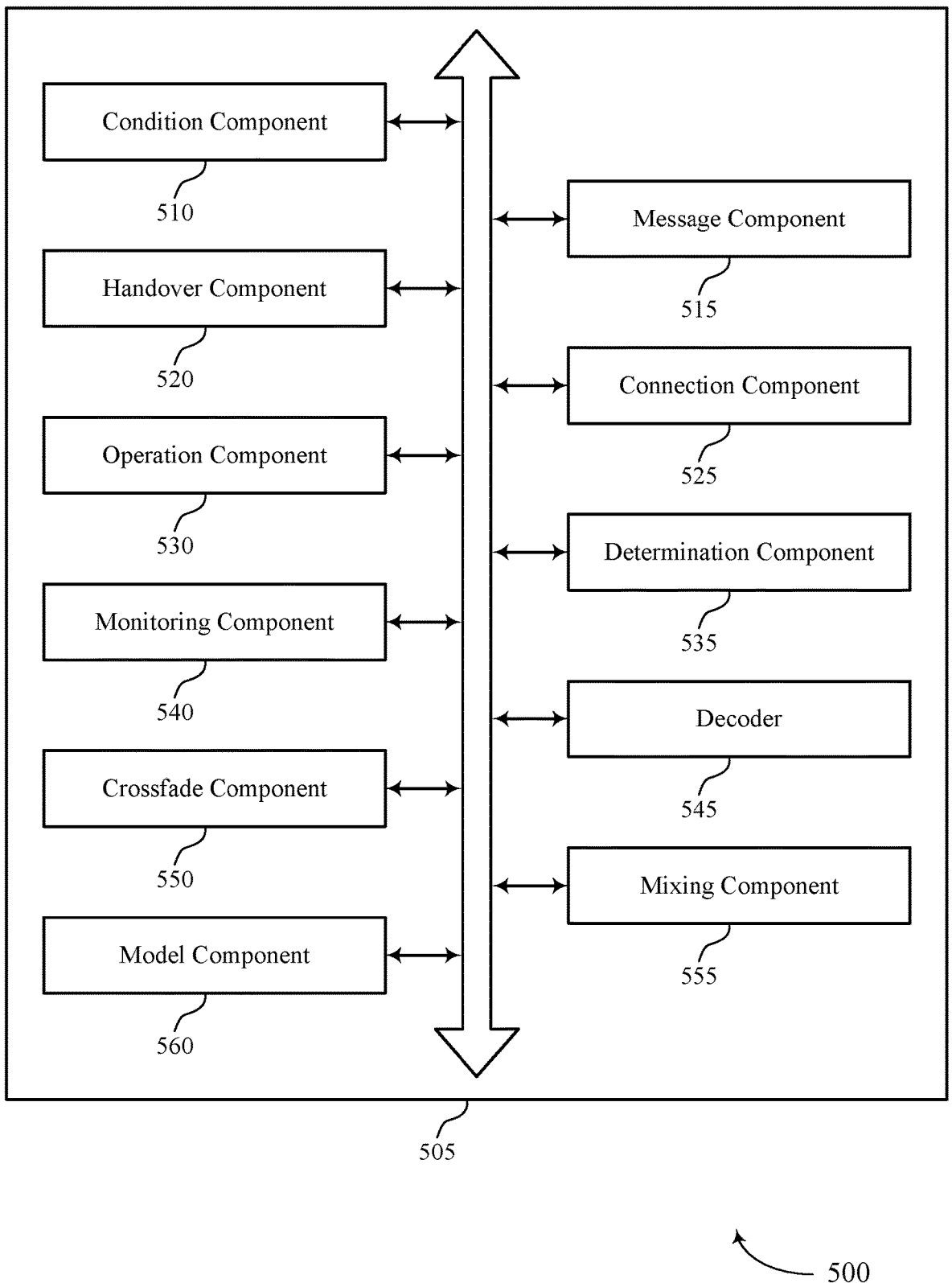
FIG. 5 shows a block diagram of a communications manager that supports handover of a logical transport channel in accordance with aspects of the present disclosure.

FIG. 5 shows a block diagram 500 of a communications manager 505 that supports handover of a logical transport channel in accordance with aspects of the present disclosure. The communications manager 505 may be an example of aspects of a communications manager 315, a communications manager 415, or a communications manager 610 described herein. The communications manager 505 may include a condition component 510, a message component 515, a handover component 520, a connection component 525, an operation component 530, a determination component 535, a monitoring component 540, a decoder 545, a crossfade component 550, a mixing component 555, and a model component 560. Each of these modules may communicate, directly or indirectly, with one another (e.g., via one or more buses).

The condition component 510 may determine that a quality condition of a primary Bluetooth-enabled device is lower than a quality condition of a secondary Bluetooth-enabled device. The message component 515 may transmit, from the primary Bluetooth-enabled device to the secondary Bluetooth-enabled device, a handover request message based on the determining, the handover request message including a subset of connection information associated with a connection between the primary Bluetooth-enabled device and a device in wireless communications with the primary Bluetooth-enabled device. In some cases, the subset of connection information includes a logical transport channel parameter associated with the at least one logical transport channel of the set of logical transport channels. In some cases, at least one logical transport channel of the set of logical transport channels includes an eSCO logical transport channel, and the logical transport channel parameter includes an eSCO logical transport channel address of the eSCO logical transport channel. In some examples, the message component 515 may receive, from the secondary Bluetooth-enabled device, a handover response message based on the handover request message. In some examples, the message component 515 may receive timing information as part of the handover request message, the timing information indicating when the handover of the at least one logical transport channel of the set of logical transport channel from the primary Bluetooth-enabled device to the secondary Bluetooth-enabled device is to occur.

In some examples, the message component 515 may receive, at the primary Bluetooth-enabled device, a second handover request message from the secondary Bluetooth-enabled device, the second handover request message including the subset of connection information associated with the connection between the primary Bluetooth-enabled device and the device in wireless communications with the primary Bluetooth-enabled device and the secondary Bluetooth-enabled device. In some examples, the message component 515 may transmit, from the primary Bluetooth-enabled device, a second handover response message to the secondary Bluetooth-enabled device based on the second handover request message.

The handover component 520 may hand over, from the primary Bluetooth-enabled device to the secondary Bluetooth-enabled device, at least one logical transport channel of the set of logical transport channels based on the handover response message. In some examples, the handover component 520 may hand over, from the primary Bluetooth-enabled device to the secondary Bluetooth-enabled device, the eSCO logical transport channel associated with the connection according to the eSCO logical transport channel address. In some examples, the handover component 520 may receive, from the secondary Bluetooth-enabled device at the primary Bluetooth-enabled device, a handover of the at least one logical transport channel of the set of logical transport channels based on the second handover response message.

The connection component 525 may maintain, by the primary Bluetooth-enabled device, at least one second logical transport channel of the set of logical transport channels associated with the connection between the primary Bluetooth-enabled device and the device in wireless communications with the primary Bluetooth-enabled device based on the handover of the eSCO logical transport channel, where the at least one second logical transport channel includes an ACL logical transport channel, and where maintaining the least one second logical transport channel includes maintaining the ACL logical transport channel in a connected state, where handing over the eSCO logical transport channel is based on maintaining the ACL logical transport channel.

In some examples, connection component 525 may receive a voice packet of the secondary Bluetooth-enabled device over at least one second logical transport channel different from the at least one logical transport channel of the set of logical transport channels, where the at least one second logical transport channel includes an ACL logical transport channel or an eSCO logical transport channel, where decoding the voice packet is further based on receiving the voice packet of the secondary Bluetooth-enabled device.

The operation component 530 may adjust an operation of the primary Bluetooth-enabled device based on handing over the at least one logical transport channel of the set of logical transport channels, where the operation includes setting a volume level of a microphone of the primary Bluetooth-enabled device, or monitoring the at least one logical transport channel of the set of logical transport channels, or a combination thereof. In some examples, the operation component 530 may adjust a noise level of the primary Bluetooth-enabled device in accordance with a noise model of the secondary Bluetooth-enabled device, or a noise model of the primary Bluetooth-enabled device that is based on the noise model of the secondary Bluetooth-enabled device, or a combination thereof.

The determination component 535 may determine an absence of generated voice data at the primary Bluetooth-enabled device for a duration satisfying a threshold, where transmitting the handover request message to the secondary Bluetooth-enabled device is based on the absence of generated voice data at the primary Bluetooth-enabled device. The monitoring component 540 may monitor, by the primary Bluetooth-enabled device, the at least one logical transport channel of the set of logical transport channels before the handover of the at least one logical transport channel of the set of logical transport channels from the secondary Bluetooth-enabled device to the primary Bluetooth-enabled device. The decoder 545 may decode a voice packet of the secondary Bluetooth-enabled device based on the monitoring. The crossfade component 550 may crossfade the voice packet of the secondary Bluetooth-enabled device with a voice packet of the primary Bluetooth-enabled device. In some examples, the crossfade component 550 may transmit, to the device in wireless communications with the primary Bluetooth-enabled device, a crossfaded voice packet on the at least one logical transport channel. The mixing component 555 may mix the voice packet of the secondary Bluetooth-enabled device with the voice packet of the primary Bluetooth-enabled device, where crossfading the voice packet of the secondary Bluetooth-enabled device with a voice packet of the primary Bluetooth-enabled device is based on the mixing. The model component 560 may receive the noise model of the secondary Bluetooth-enabled device before the handover of the at least one logical transport channel of the set of logical transport channels from the secondary Bluetooth-enabled device to the primary Bluetooth-enabled device.

As detailed herein, the communications manager 505 and/or one or more components of the communications manager 505 may perform and/or be a means for performing, either alone or in combination with other elements, one or more operations for handover of an eSCO logical transport channel.

Figure 6:
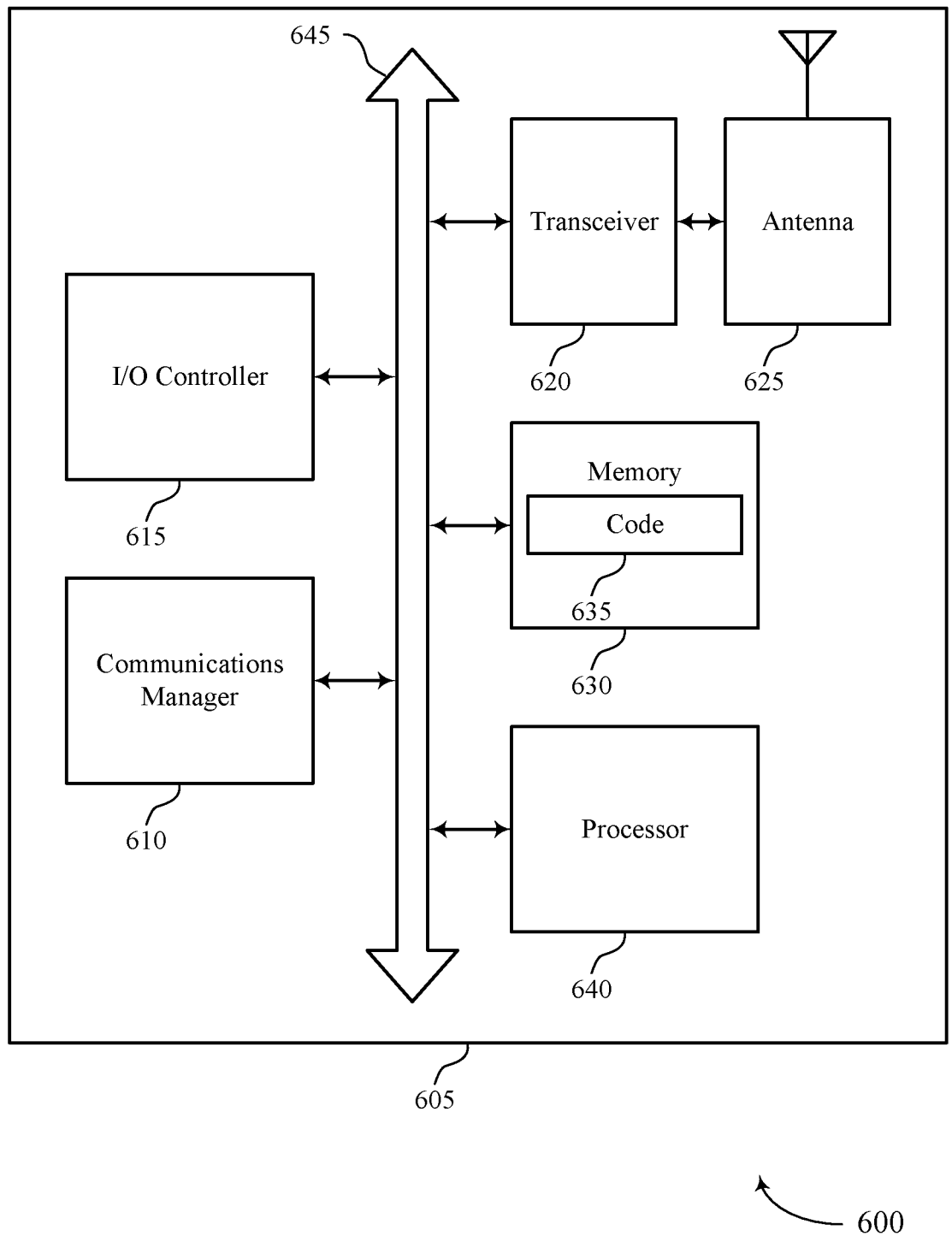
FIG. 6 shows a diagram of a system including a device that supports handover of a logical transport channel in accordance with aspects of the present disclosure.

FIG. 6 shows a diagram of a system 600 including a device 605 that supports handover of a logical transport channel in accordance with aspects of the present disclosure. The device 605 may be an example of or include the components of device 305, device 405, or a device as described herein, such as a Bluetooth-enabled device, which may include a primary Bluetooth-enabled device and a secondary Bluetooth-enabled device, for example, a pair of Bluetooth earbuds or a Bluetooth headset. The device 605 may include components for bi-directional voice and data communications including components for transmitting and receiving communications, including a communications manager 610, an I/O controller 615, a transceiver 620, an antenna 625, memory 630, and a processor 640. These components may be in electronic communication via one or more buses (e.g., bus 645).

The communications manager 610 may determine that a quality condition of a primary Bluetooth-enabled device is lower than a quality condition of a secondary Bluetooth-enabled device, transmit, from the primary Bluetooth-enabled device to the secondary Bluetooth-enabled device, a handover request message based on the determining, the handover request message including a subset of connection information associated with a connection between the primary Bluetooth-enabled device and a device in wireless communications with the primary Bluetooth-enabled device, receive, from the secondary Bluetooth-enabled device, a handover response message based on the handover request message, and hand over, from the primary Bluetooth-enabled device to the secondary Bluetooth-enabled device, at least one logical transport channel of the set of logical transport channels based on the handover response message.

The I/O controller 615 may manage input and output signals for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the device 605 via the I/O controller 615 or via hardware components controlled by the I/O controller 615.

The transceiver 620 may communicate bi-directionally, via one or more antennas, wired, or wireless links as described herein. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas. In some cases, the device 605 may include a single antenna 625. However, in some cases the device 605 may have more than one antenna 625, which may be capable of concurrently transmitting or receiving multiple wireless transmissions.

The memory 630 may include RAM and ROM. The memory 630 may store computer-readable, computer-executable code 635 including instructions that, when executed, cause the processor to perform various functions described herein. In some cases, the memory 630 may contain, among other things, a BIOS which may control basic hardware or software operation such as the interaction with peripheral components or devices.

The code 635 may include instructions to implement aspects of the present disclosure, including instructions to support wireless communications. The code 635 may be stored in a non-transitory computer-readable medium such as system memory or other type of memory. In some cases, the code 635 may not be directly executable by the processor 640 but may cause a computer (e.g., when compiled and executed) to perform functions described herein.

The processor 640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the device 605 to perform various functions (e.g., functions or tasks supporting handover of extended synchronous connection-oriented logical transport channel).

Figure 7:
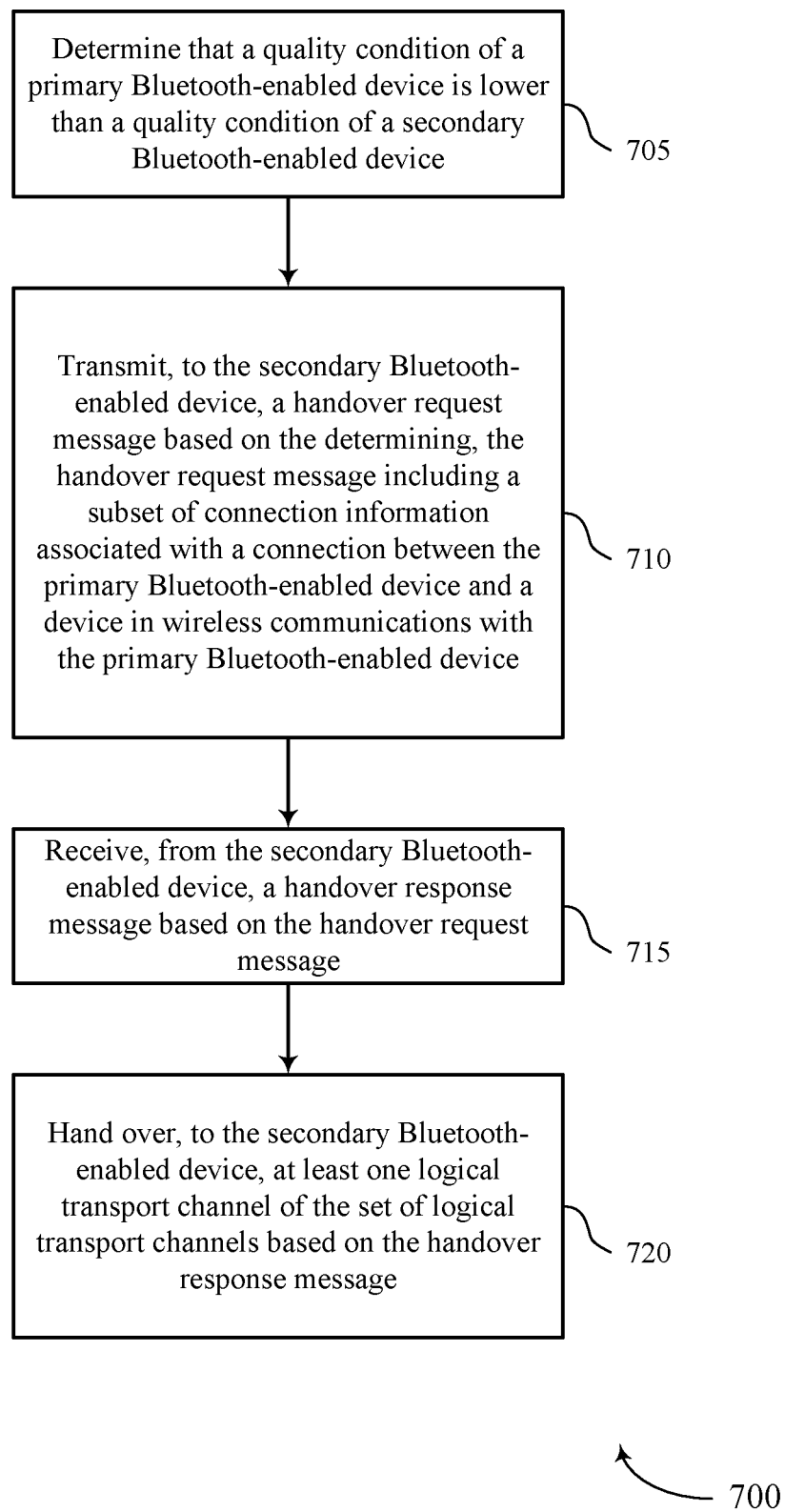
FIGS. 7 through 10 show flowcharts illustrating methods that support handover of a logical transport channel in accordance with aspects of the present disclosure.

FIG. 7 shows a flowchart illustrating a method 700 that supports handover of a logical transport channel in accordance with aspects of the present disclosure. The operations of method 700 may be implemented by a device or its components as described herein, such as a Bluetooth-enabled device, which may include a primary Bluetooth-enabled device and a secondary Bluetooth-enabled device, for example, a pair of Bluetooth earbuds or a Bluetooth headset. For example, the operations of method 700 may be performed by a communications manager as described with reference to FIGS. 3 through 6. In some examples, a device may execute a set of instructions to control the functional elements of the device to perform the functions described herein. Additionally or alternatively, a device may perform aspects of the functions described herein using special-purpose hardware.

At 705, the primary Bluetooth-enabled device may determine that a quality condition of the primary Bluetooth-enabled device is lower than a quality condition of a secondary Bluetooth-enabled device. The operations of 705 may be performed according to the methods described herein. In some examples, aspects of the operations of 705 may be performed by a condition component as described with reference to FIGS. 3 through 6.

At 710, the primary Bluetooth-enabled device may transmit, to the secondary Bluetooth-enabled device, a handover request message based on the determining, the handover request message including a subset of connection information associated with a connection between the primary Bluetooth-enabled device and a device in wireless communications with the primary Bluetooth-enabled device. The operations of 710 may be performed according to the methods described herein. In some examples, aspects of the operations of 710 may be performed by a message component as described with reference to FIGS. 3 through 6.

At 715, the primary Bluetooth-enabled device may receive, from the secondary Bluetooth-enabled device, a handover response message based on the handover request message. The operations of 715 may be performed according to the methods described herein. In some examples, aspects of the operations of 715 may be performed by a message component as described with reference to FIGS. 3 through 6.

At 720, the primary Bluetooth-enabled device may hand over, to the secondary Bluetooth-enabled device, at least one logical transport channel of the set of logical transport channels based on the handover response message. The operations of 720 may be performed according to the methods described herein. In some examples, aspects of the operations of 720 may be performed by a handover component as described with reference to FIGS. 3 through 6.

Figure 8:
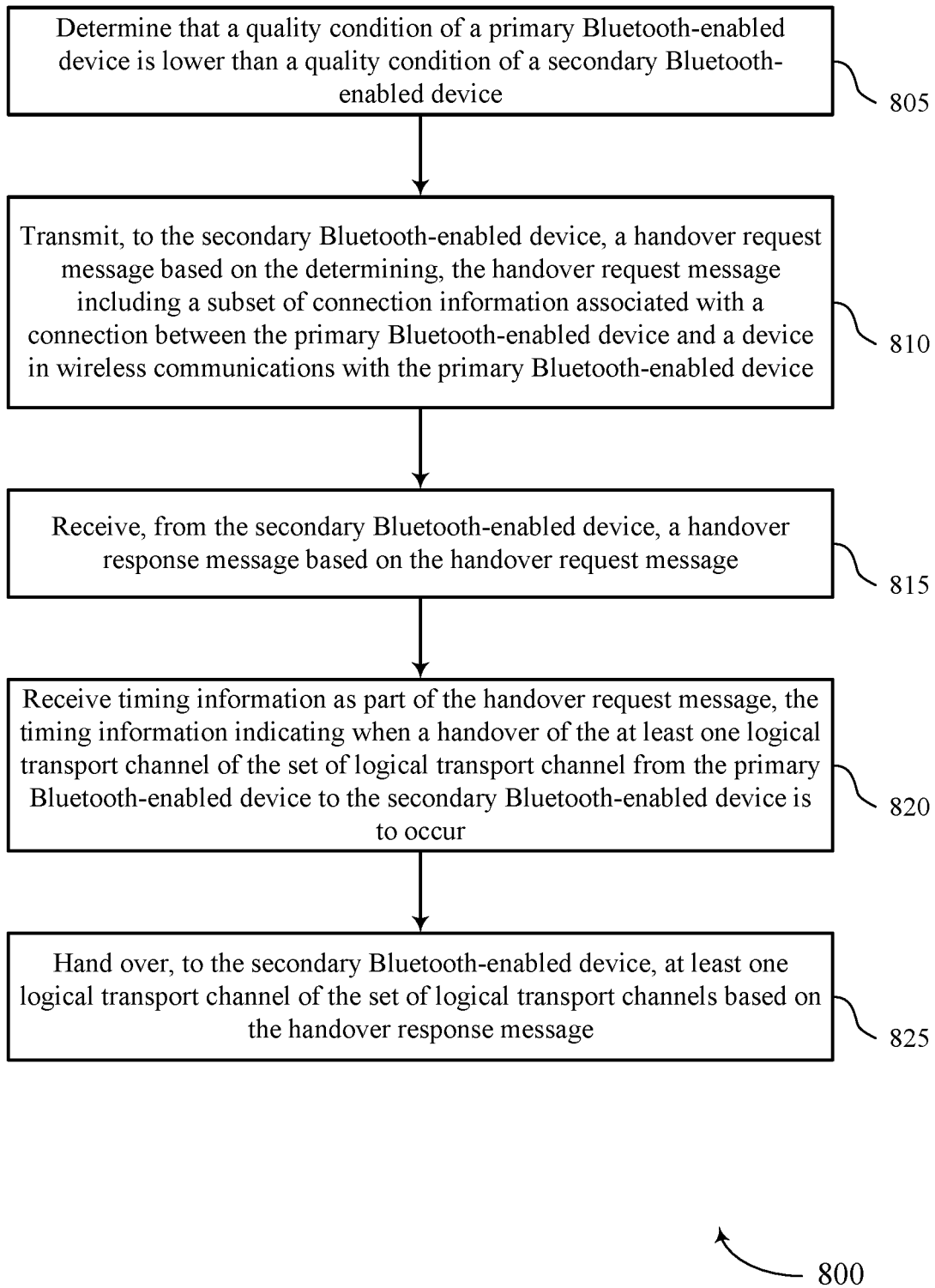

FIG. 8 shows a flowchart illustrating a method 800 that supports handover of a logical transport channel in accordance with aspects of the present disclosure. The operations of method 800 may be implemented by a device or its components as described herein, such as a Bluetooth-enabled device, which may include a primary Bluetooth-enabled device and a secondary Bluetooth-enabled device, for example, a pair of Bluetooth earbuds or a Bluetooth headset. For example, the operations of method 800 may be performed by a communications manager as described with reference to FIGS. 3 through 6. In some examples, a device may execute a set of instructions to control the functional elements of the device to perform the functions described herein. Additionally or alternatively, a device may perform aspects of the functions described herein using special-purpose hardware.

At 805, a primary Bluetooth-enabled device may determine that a quality condition of the primary Bluetooth-enabled device is lower than a quality condition of a secondary Bluetooth-enabled device. The operations of 805 may be performed according to the methods described herein. In some examples, aspects of the operations of 805 may be performed by a condition component as described with reference to FIGS. 3 through 6.

At 810, the primary Bluetooth-enabled device may transmit, to the secondary Bluetooth-enabled device, a handover request message based on the determining, the handover request message including a subset of connection information associated with a connection between the primary Bluetooth-enabled device and a device in wireless communications with the primary Bluetooth-enabled device. The operations of 810 may be performed according to the methods described herein. In some examples, aspects of the operations of 810 may be performed by a message component as described with reference to FIGS. 3 through 6.

At 815, the primary Bluetooth-enabled device may receive, from the secondary Bluetooth-enabled device, a handover response message based on the handover request message. The operations of 815 may be performed according to the methods described herein. In some examples, aspects of the operations of 815 may be performed by a message component as described with reference to FIGS. 3 through 6.

At 820, the primary Bluetooth-enabled device may receive timing information as part of the handover request message, the timing information indicating when a handover of the at least one logical transport channel of the set of logical transport channel from the primary Bluetooth-enabled device to the secondary Bluetooth-enabled device is to occur. The operations of 820 may be performed according to the methods described herein. In some examples, aspects of the operations of 820 may be performed by a message component as described with reference to FIGS. 3 through 6.

At 825, the primary Bluetooth-enabled device may hand over, to the secondary Bluetooth-enabled device, at least one logical transport channel of the set of logical transport channels based on the handover response message. The operations of 825 may be performed according to the methods described herein. In some examples, aspects of the operations of 825 may be performed by a handover component as described with reference to FIGS. 3 through 6.

Figure 9:
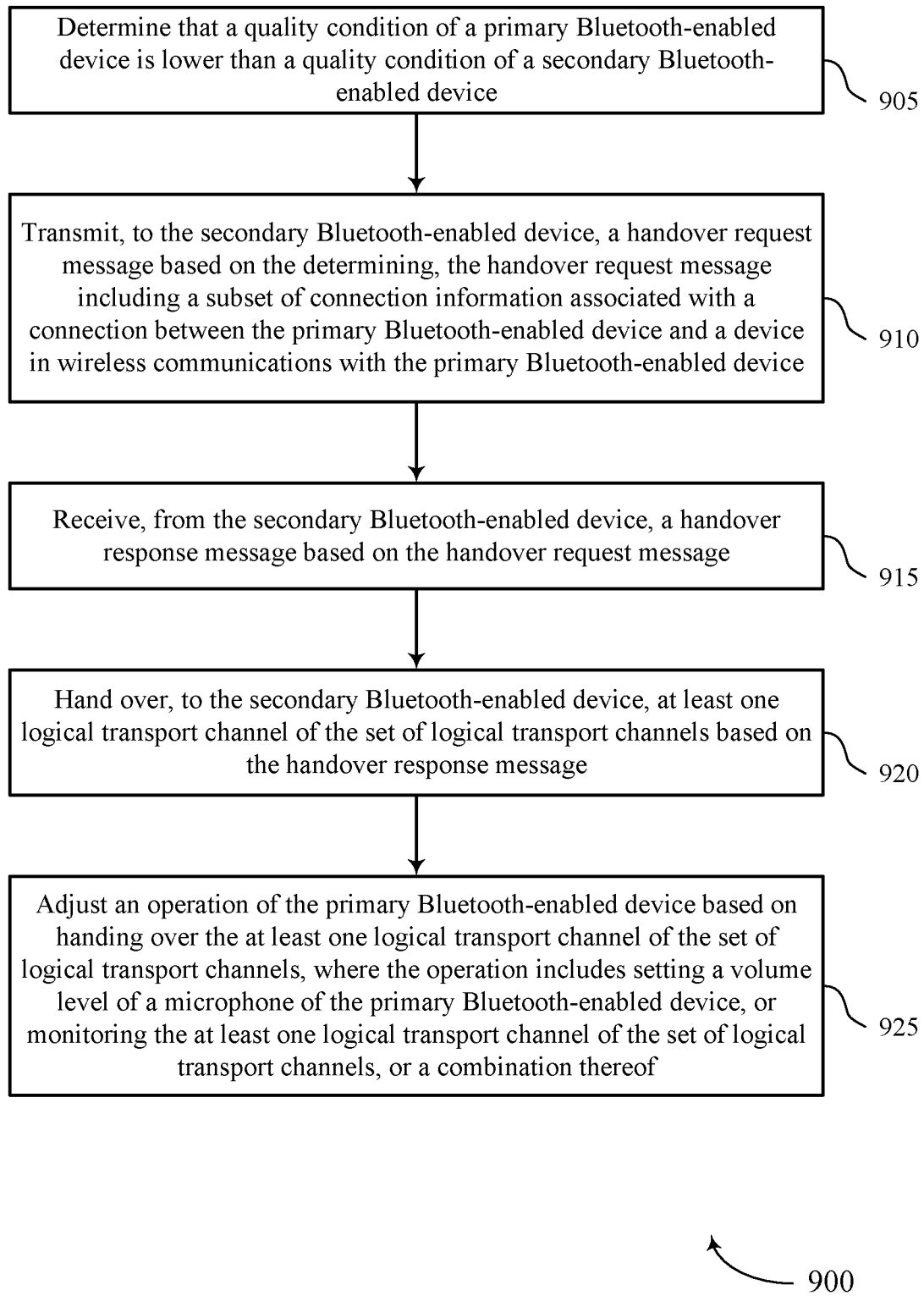

FIG. 9 shows a flowchart illustrating a method 900 that supports handover of a logical transport channel in accordance with aspects of the present disclosure. The operations of method 900 may be implemented by a device or its components as described herein, such as a Bluetooth-enabled device, which may include a primary Bluetooth-enabled device and a secondary Bluetooth-enabled device, for example, a pair of Bluetooth earbuds or a Bluetooth headset. For example, the operations of method 900 may be performed by a communications manager as described with reference to FIGS. 3 through 6. In some examples, a device may execute a set of instructions to control the functional elements of the device to perform the functions described herein. Additionally or alternatively, a device may perform aspects of the functions described herein using special-purpose hardware.

At 905, a primary Bluetooth-enabled device may determine that a quality condition of the primary Bluetooth-enabled device is lower than a quality condition of a secondary Bluetooth-enabled device. The operations of 905 may be performed according to the methods described herein. In some examples, aspects of the operations of 905 may be performed by a condition component as described with reference to FIGS. 3 through 6.

At 910, the primary Bluetooth-enabled device may transmit, to the secondary Bluetooth-enabled device, a handover request message based on the determining, the handover request message including a subset of connection information associated with a connection between the primary Bluetooth-enabled device and a device in wireless communications with the primary Bluetooth-enabled device. The operations of 910 may be performed according to the methods described herein. In some examples, aspects of the operations of 910 may be performed by a message component as described with reference to FIGS. 3 through 6.

At 915, the primary Bluetooth-enabled device may receive, from the secondary Bluetooth-enabled device, a handover response message based on the handover request message. The operations of 915 may be performed according to the methods described herein. In some examples, aspects of the operations of 915 may be performed by a message component as described with reference to FIGS. 3 through 6.

At 920, the primary Bluetooth-enabled device may hand over, to the secondary Bluetooth-enabled device, at least one logical transport channel of the set of logical transport channels based on the handover response message. The operations of 920 may be performed according to the methods described herein. In some examples, aspects of the operations of 920 may be performed by a handover component as described with reference to FIGS. 3 through 6.

At 925, the primary Bluetooth-enabled device may adjust an operation of the primary Bluetooth-enabled device based on handing over the at least one logical transport channel of the set of logical transport channels, where the operation includes setting a volume level of a microphone of the primary Bluetooth-enabled device, or monitoring the at least one logical transport channel of the set of logical transport channels, or a combination thereof. The operations of 925 may be performed according to the methods described herein. In some examples, aspects of the operations of 925 may be performed by an operation component as described with reference to FIGS. 3 through 6.

Figure 10:
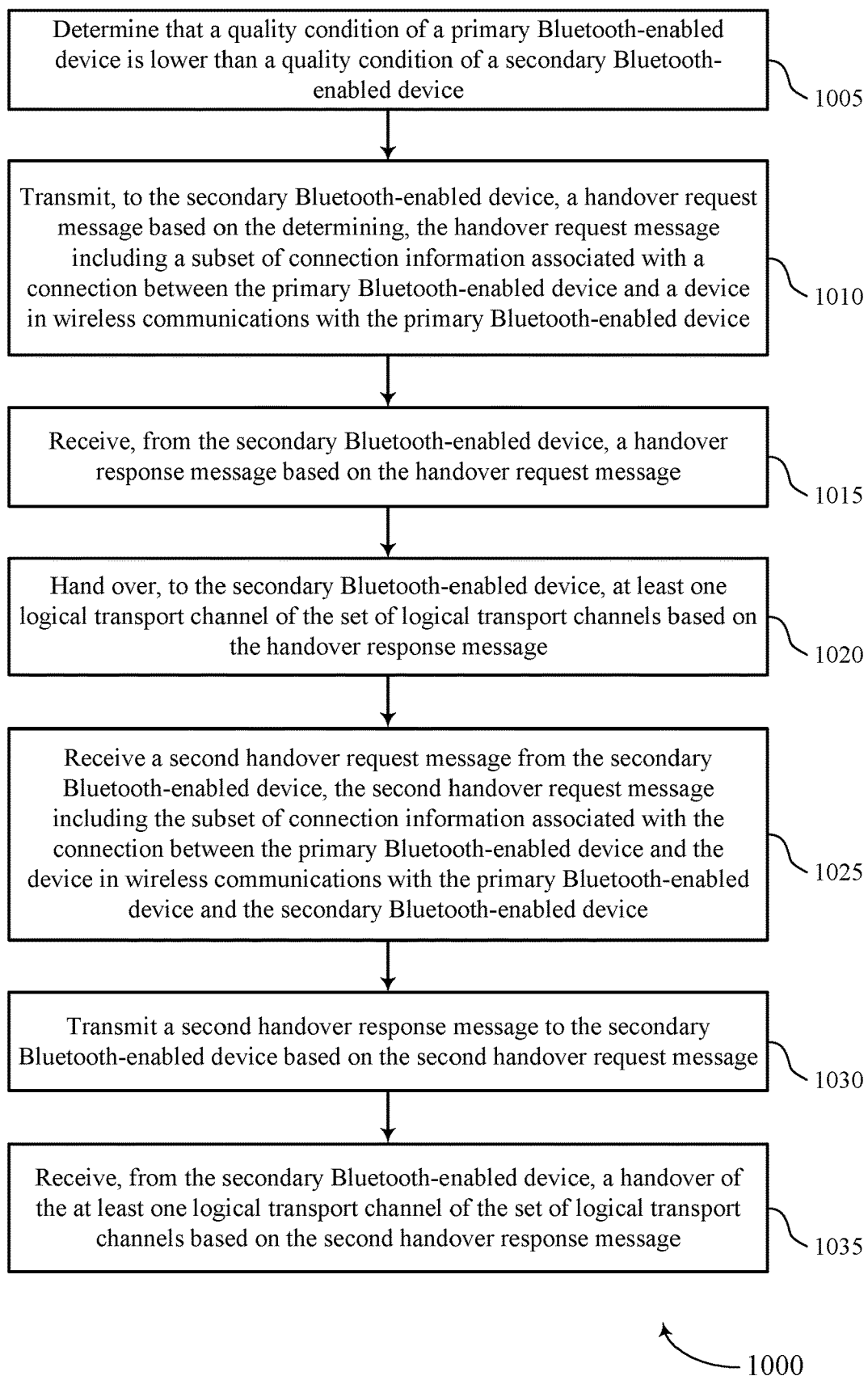

FIG. 10 shows a flowchart illustrating a method 1000 that supports handover of a logical transport channel in accordance with aspects of the present disclosure. The operations of method 1000 may be implemented by a device or its components as described herein, such as a Bluetooth-enabled device, which may include a primary Bluetooth-enabled device and a secondary Bluetooth-enabled device, for example, a pair of Bluetooth earbuds or a Bluetooth headset. For example, the operations of method 1000 may be performed by a communications manager as described with reference to FIGS. 3 through 6. In some examples, a device may execute a set of instructions to control the functional elements of the device to perform the functions described herein. Additionally or alternatively, a device may perform aspects of the functions described herein using special-purpose hardware.

At 1005, a primary Bluetooth-enabled device may determine that a quality condition of the primary Bluetooth-enabled device is lower than a quality condition of a secondary Bluetooth-enabled device. The operations of 1005 may be performed according to the methods described herein. In some examples, aspects of the operations of 1005 may be performed by a condition component as described with reference to FIGS. 3 through 6.

At 1010, the primary Bluetooth-enabled device may transmit, to the secondary Bluetooth-enabled device, a handover request message based on the determining, the handover request message including a subset of connection information associated with a connection between the primary Bluetooth-enabled device and a device in wireless communications with the primary Bluetooth-enabled device. The operations of 1010 may be performed according to the methods described herein. In some examples, aspects of the operations of 1010 may be performed by a message component as described with reference to FIGS. 3 through 6.

At 1015, the primary Bluetooth-enabled device may receive, from the secondary Bluetooth-enabled device, a handover response message based on the handover request message. The operations of 1015 may be performed according to the methods described herein. In some examples, aspects of the operations of 1015 may be performed by a message component as described with reference to FIGS. 3 through 6.

At 1020, the primary Bluetooth-enabled device may hand over, to the secondary Bluetooth-enabled device, at least one logical transport channel of the set of logical transport channels based on the handover response message. The operations of 1020 may be performed according to the methods described herein. In some examples, aspects of the operations of 1020 may be performed by a handover component as described with reference to FIGS. 3 through 6.

At 1025, the primary Bluetooth-enabled device may receive a second handover request message from the secondary Bluetooth-enabled device, the second handover request message including the subset of connection information associated with the connection between the primary Bluetooth-enabled device and the device in wireless communications with the primary Bluetooth-enabled device and the secondary Bluetooth-enabled device. The operations of 1025 may be performed according to the methods described herein. In some examples, aspects of the operations of 1025 may be performed by a message component as described with reference to FIGS. 3 through 6.

At 1030, the primary Bluetooth-enabled device may transmit a second handover response message to the secondary Bluetooth-enabled device based on the second handover request message. The operations of 1030 may be performed according to the methods described herein. In some examples, aspects of the operations of 1030 may be performed by a message component as described with reference to FIGS. 3 through 6.

At 1035, the primary Bluetooth-enabled device may receive, from the secondary Bluetooth-enabled device, a handover of the at least one logical transport channel of the set of logical transport channels based on the second handover response message. The operations of 1035 may be performed according to the methods described herein. In some examples, aspects of the operations of 1035 may be performed by a handover component as described with reference to FIGS. 3 through 6.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising: determining that a quality condition of a primary Bluetooth-enabled device is lower than a quality condition of a secondary Bluetooth-enabled device; transmitting, from the primary Bluetooth-enabled device to the secondary Bluetooth-enabled device, a handover request message based at least in part on the determining, the handover request message comprising a subset of connection information associated with a connection between the primary Bluetooth-enabled device and a device in wireless communications with the primary Bluetooth-enabled device; receiving, from the secondary Bluetooth-enabled device, a handover response message based at least in part on the handover request message; and handing over, from the primary Bluetooth-enabled device to the secondary Bluetooth-enabled device, at least one logical transport channel of a set of logical transport channels based at least in part on the handover response message.

2. The method of claim 1, further comprising:
   receiving timing information as part of the handover request message, the timing information indicating when the handover of the at least one logical transport channel of the set of logical transport channel from the primary Bluetooth-enabled device to the secondary Bluetooth-enabled device is to occur.

3. The method of claim 1, further comprising:
   the subset of connection information comprises a logical transport channel parameter associated with the at least one logical transport channel of the set of logical transport channels.

4. The method of claim 3, wherein at least one logical transport channel of the set of logical transport channels comprises an extended synchronous connection-oriented (eSCO) logical transport channel, and the logical transport channel parameter comprises an eSCO logical transport channel address of the eSCO logical transport channel.

5. The method of claim 4, wherein handing over the at least one logical transport channel of the set of logical transport channels comprises:
   handing over, from the primary Bluetooth-enabled device to the secondary Bluetooth-enabled device, the eSCO logical transport channel associated with the connection according to the eSCO logical transport channel address.

6. The method of claim 5, further comprising:
   maintaining, by the primary Bluetooth-enabled device, at least one second logical transport channel of the set of logical transport channels associated with the connection between the primary Bluetooth-enabled device and the device in wireless communications with the primary Bluetooth-enabled device based at least in part on the handover of the eSCO logical transport channel,
   wherein the at least one second logical transport channel comprises an asynchronous connection-less (ACL) logical transport channel, and
   wherein maintaining the least one second logical transport channel comprises maintaining the ACL logical transport channel in a connected state, wherein handing over the eSCO logical transport channel is based at least in part on maintaining the ACL logical transport channel.

7. The method of claim 1, further comprising:
   adjusting an operation of the primary Bluetooth-enabled device based at least in part on handing over the at least one logical transport channel of the set of logical transport channels, wherein the operation comprises setting a volume level of a microphone of the primary Bluetooth-enabled device, or monitoring the at least one logical transport channel of the set of logical transport channels, or a combination thereof.

8. The method of claim 1, further comprising:
   determining an absence of generated voice data at the primary Bluetooth-enabled device for a duration satisfying a threshold,
   wherein transmitting the handover request message to the secondary Bluetooth-enabled device is based at least in part on the absence of generated voice data at the primary Bluetooth-enabled device.

9. The method of claim 1, further comprising:
   receiving, at the primary Bluetooth-enabled device, a second handover request message from the secondary Bluetooth-enabled device, the second handover request message comprising the subset of connection information associated with the connection between the primary Bluetooth-enabled device and the device in wireless communications with the primary Bluetooth-enabled device and the secondary Bluetooth-enabled device;
   transmitting, from the primary Bluetooth-enabled device, a second handover response message to the secondary Bluetooth-enabled device based at least in part on the second handover request message; and receiving, from the secondary Bluetooth-enabled device at the primary Bluetooth-enabled device, a handover of the at least one logical transport channel of the set of logical transport channels based at least in part on the second handover response message.

10. The method of claim 9, further comprising:

monitoring, by the primary Bluetooth-enabled device, the at least one logical transport channel of the set of logical transport channels before the handover of the at least one logical transport channel of the set of logical transport channels from the secondary Bluetooth-enabled device to the primary Bluetooth-enabled device;

decoding a voice packet of the secondary Bluetooth-enabled device based at least in part on the monitoring;

crossfading the voice packet of the secondary Bluetooth-enabled device with a voice packet of the primary Bluetooth-enabled device; and transmitting, to the device in wireless communications with the primary Bluetooth-enabled device, a crossfaded voice packet on the at least one logical transport channel.

11. The method of claim 10, further comprising:

receiving the voice packet of the secondary Bluetooth-enabled device over at least one second logical transport channel different from the at least one logical transport channel of the set of logical transport channels, wherein the at least one second logical transport channel comprises an asynchronous connection-less (ACL) logical transport channel or an extended synchronous connection-oriented (eSCO) logical transport channel, wherein decoding the voice packet is further based at least in part on receiving the voice packet of the secondary Bluetooth-enabled device.

12. The method of claim 10, further comprising:

mixing the voice packet of the secondary Bluetooth-enabled device with the voice packet of the primary Bluetooth-enabled device, wherein crossfading the voice packet of the secondary Bluetooth-enabled device with a voice packet of the primary Bluetooth-enabled device is based at least in part on the mixing.

13. The method of claim 9, further comprising:

receiving a noise model of the secondary Bluetooth-enabled device before the handover of the at least one logical transport channel of the set of logical transport channels from the secondary Bluetooth-enabled device to the primary Bluetooth-enabled device; and adjusting a noise level of the primary Bluetooth-enabled device in accordance with the noise model of the secondary Bluetooth-enabled device, or a noise model of the primary Bluetooth-enabled device that is based at least in part on the noise model of the secondary Bluetooth-enabled device, or a combination thereof.

14. The method of claim 1, wherein the quality condition of the primary Bluetooth-enabled device comprises a signal quality associated with the connection between the primary Bluetooth-enabled device and the device in wireless communications with the primary Bluetooth-enabled device, a signal strength associated with the connection between the primary Bluetooth-enabled device and the device in wireless communications with the primary Bluetooth-enabled device, a microphone quality of the primary Bluetooth-enabled device, a battery level of the primary Bluetooth-enabled device, or a physical location of the primary Bluetooth-enabled device, or a combination thereof.

15. The method of claim 1, wherein the quality condition of the secondary Bluetooth-enabled device comprises a microphone quality of the secondary Bluetooth-enabled device, a battery level of the secondary Bluetooth-enabled device, a physical location of the secondary Bluetooth-enabled device, or a combination thereof.

16. The method of claim 1, wherein the primary Bluetooth-enabled device and the secondary Bluetooth-enabled device comprise a pair of Bluetooth earbuds or a Bluetooth headset.

17. An apparatus for wireless communications, comprising: a processor, memory in electronic communication with the processor; and instructions stored in the memory and executable by the processor to cause the apparatus to: determine that a quality condition of the apparatus is lower than a quality condition of a secondary apparatus; transmit, from the apparatus to the secondary apparatus, a handover request message based at least in part on the determining, the handover request message comprising a subset of connection information associated with a connection between the apparatus and a device in wireless communications with the apparatus; receive, from the secondary apparatus, a handover response message based at least in part on the handover request message; and hand over, from the apparatus to the secondary apparatus, at least one logical transport channel of a set of logical transport channels based at least in part on the handover response message.

18. The apparatus of claim 17, wherein the instructions are further executable by the processor to cause the apparatus to:

receive timing information as part of the handover request message, the timing information indicating when the handover of the at least one logical transport channel of the set of logical transport channel from the apparatus to the secondary apparatus is to occur.

19. An apparatus for wireless communications, comprising: means for determining that a quality condition of the apparatus is lower than a quality condition of a secondary apparatus; means for transmitting, from the apparatus to the secondary apparatus, a handover request message based at least in part on the determining, the handover request message comprising a subset of connection information associated with a connection between the apparatus and a device in wireless communications with the apparatus; means for receiving, from the secondary apparatus, a handover response 9 message based at least in part on the handover request message; and means for handing over, from the apparatus to the secondary apparatus, at least one logical transport channel of a set of logical transport channels based at least in part on the handover response message.

20. The apparatus of claim 19, further comprising:

means for receiving timing information as part of the handover request message, the timing information indicating when the handover of the at least one logical transport channel of the set of logical transport channel from the apparatus to the secondary apparatus is to occur.

* * * * *